(12) United States Patent  (10) Patent No.: US 9,008,474 B2
Nakanishi  (45) Date of Patent: Apr. 14, 2015

(54) OPTICAL MODULE HAVING FOCUSED OPTICAL COUPLING SYSTEM FOR SINGLE FIBER

(75) Inventor: Hiromi Nakanishi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 346 days.

(21) Appl. No.: 13/391,716

(22) PCT Filed: Nov. 11, 2010

(86) PCT No.: PCT/JP2010/070515
§ 371 (c)(1),
(2), (4) Date: Feb. 22, 2012

(87) PCT Pub. No.: WO2011/059107
PCT Pub. Date: May 19, 2011

(65) Prior Publication Data
US 2012/0148192 A1  Jun. 14, 2012

(30) Foreign Application Priority Data
Nov. 11, 2009 (JP) .................................. 2009-258058
Jul. 26, 2010 (JP) .................................. 2010-166653

(51) Int. Cl.
*G02B 6/32* (2006.01)
*G02B 6/42* (2006.01)
(52) U.S. Cl.
CPC ............ *G02B 6/4206* (2013.01); *G02B 6/4208* (2013.01); *G02B 6/4215* (2013.01); *G02B 6/4231* (2013.01); *G02B 6/4246* (2013.01)

(58) Field of Classification Search
CPC ........................... G02B 6/4206; G02B 6/4246
USPC ........................................................... 385/33
See application file for complete search history.

(56) References Cited

U.S. PATENT DOCUMENTS 3,974,507 A * 8/1976 Chemelli et al. .............. 347/258
6,201,908 B1  3/2001 Grann
6,493,121 B1  12/2002 Althaus
(Continued)

FOREIGN PATENT DOCUMENTS

JP  2003-524789 A  8/2003
JP  2004-093971 A  3/2004
(Continued)

OTHER PUBLICATIONS

Notification of Reasons of Rejection in Japanese Patent Application No. 2010-166653, dated Jul. 1, 2014.

*Primary Examiner* — Eric Wong
*Assistant Examiner* — Mary El Shammaa
(74) *Attorney, Agent, or Firm* — Venable LLP; Michael A. Sartori; F. Brock Riggs

(57) ABSTRACT

An optical module is disclosed, in which the optical module installs a plurality of optical devices each optically coupling with a single fiber in the focused beam coupling system. The optical module includes a condenser lens, and respective optical devices install an individual lens. One of the beam waists of the condenser lens locates on the end of the optical fiber and the other of the beam waist locates on the outer wall of the coupling unit to which the optical devices are attached. One of the beam waists of the individual lens in the optical device substantially aligns with the other beam waist of the condenser lens, while, the other of the beam waist of the individual lens aligns at the semiconductor optical device.

11 Claims, 19 Drawing Sheets

(56) References Cited

U.S. PATENT DOCUMENTS

| | | |
|---|---|---|
| 7,184,621 B1 | 2/2007 | Zhu |
| 7,982,957 B2 * | 7/2011 | Takeuchi et al. ............. 359/626 |
| 2003/0076598 A1 * | 4/2003 | Kittaka et al. ................ 359/641 |
| 2004/0223705 A1 | 11/2004 | Kropp |
| 2006/0018204 A1 | 1/2006 | Lee et al. |
| 2006/0093264 A1 * | 5/2006 | Tabuchi .......................... 385/33 |
| 2009/0059976 A1 * | 3/2009 | Shibatani ................... 372/29.01 |

FOREIGN PATENT DOCUMENTS

| | | |
|---|---|---|
| JP | 2004-361502 A | 12/2004 |
| JP | 2005-309370 | 11/2005 |
| JP | 2006-285087 A | 10/2006 |
| JP | 2006-351608 A | 12/2006 |
| JP | 2008-090231 | 4/2008 |
| WO | WO-2004/053532 A2 | 6/2004 |

* cited by examiner

OPTICAL MODULE HAVING FOCUSED OPTICAL COUPLING SYSTEM FOR SINGLE FIBER

TECHNICAL FIELD

The present invention relates to an optical module implemented with a focused optical coupling system for a single fiber, in particular, the invention relates to an optical module installing a plurality of optical devices each coupled with the single fiber by the focused beam coupling system.

BACKGROUND ART

An transmitter optical module applied in the optical communication system as an optical signal source provides an semiconductor laser diode (hereafter denoted as LD) and an optical coupling system to couple the light emitted by the LD with the optical fiber through at least one lens. A receiver optical module also applied in the optical communication system provides a semiconductor photodiode (hereafter denoted as PD) and an optical coupling system to couple the light provided from the optical fiber with the PD through at least one lens. Moreover, a bi-directional optical module has been known, which includes both the transmitter optical module and the receiver optical module, and may perform the optical transmission and the optical reception for the single fiber.

Conventional optical modules described above usually provide the optical coupling system between the optical fiber and the semiconductor device to be, what is called, the parallel beam coupling system, that is, the light output from the LD, which is divergent light, is collimated by a first lens, and focused on an end of the fiber by another lens, a condenser lens. This coupling system may secure an enough distance between two lenses; accordingly, other optical components such as an optical isolator and so on may be set between two lenses.

FIG. 13 schematically illustrates a parallel beam coupling system of a conventional optical module 100 that installs two LDs and one PD each processing light with a specific wavelength different from others. These three optical devices, 117A, 117B and 119B, communicate with the signal fiber 113 through individual lenses, 122a, 122b and 122f, and a condenser lens 121. The light emitted from the LD, 114a and 114b, is collimated by an individual lenses, 122a and 122b, multiplexed by a WDM filter 124a and condensed by the condenser lens 121 on the end of the optical fiber 113; while the light provided from the optical fiber 113 is collimated by the condenser lens 121, reflected by the second WDM filter 124d, and focused on the surface of the PD 115b by the individual lens 122f.

The individual lenses, 122a to 122f, are installed in respective optical devices, 117A to 119B. Because the optical module 100 has the parallel beam coupling system, the optical alignment along the optical axis of respective optical devices, 117A to 119B, may be roughly carried out, and only the alignment in a plane perpendicular to respective optical axes are precisely performed by sliding the optical device, 117A to 119B, on the outer wall of the coupling unit 111.

FIG. 12B estimates the optical coupling loss when the condenser lens is offset from the optical axis in the optical system shown in FIG. 12A, where a distance between two lenses is set to be 5.00 mm, a working distance from the end of the fiber to the lens is set to be 1.762 mm, and another working distance from the LD to the lens is set to be 0.297 mm. Offsetting the condenser lens in the plane perpendicular to the optical axis, the optical coupling loss monitored through the optical fiber is evaluated. FIG. 12B shows that the loss degrades more than 0.5 dB for an offset of only 5 μm; and for the offset of 3 μm, the coupling loss increases to around 0.2 dB.

FIG. 11B shows a result of the same estimation with those shown in FIG. 12B for the focused beam coupling system of FIG. 11A where a distance between two lenses is set to be 5.13 mm, a working distance from the lens to the optical fiber is set to be 2.84 mm, and another working distance from the other lens to the LD is set to be 0.27 mm. In the focused beam coupling system, the coupling loss is less than 0.6 dB even when the offset of the lens increases more than 50 μm, and the coupling loss less than 0.2 dB is allowed for the offset of about 30 μm, which means that the focused beam coupling system makes it possible to facilitate the optical alignment between the optical fiber and the optical devices, even when an optical module is necessary to install a plurality of optical devices for the single fiber.

SUMMARY OF INVENTION

An aspect of the present invention relates to an optical module that communicates with an external optical fiber. The optical module may comprise at least one optical device and a condenser lens. The optical device may install a semiconductor optical device optically coupled with the optical fiber and an individual lens. One feature of the optical module according to the present invention is that the semiconductor optical device is aligned in one of beam waists of the individual lens, the optical fiber is aligned in one of beam waists of the condenser lens, and the other of beam waists of the condenser lens is aligned with the other of the beam waists of the individual lens. Thus, the semiconductor optical device, the individual lens, the condenser lens, and the optical fiber may constitute the focused beam coupling system.

The optical module may further comprise a coupling unit that installs the condenser lens therein, attaches the optical device and the optical fiber which is secured in a sleeve in respective walls thereto. The optical device may be attached to the coupling unit through a J-sleeve which may align the other beam waist of the individual lens with the other beam waist of the condenser lens. The condenser lens may have the image magnification of unity, which enables the alignment of the condenser lens and the optical fiber primarily depending only on the physical dimensions thereof without any precise alignment. The optical device may be a transmitter optical device that installs an LD that emits light with a specific wavelength, and the optical module may further include an optical isolator to prevent stray light from entering the LD. The optical module may further comprise a receiver optical module in addition to the transmitter optical module. The receiver optical module may receive light from the optical fiber. The light provided from the optical fiber has a specific wavelength different from a wavelength of the light emitted from the LD. Thus, the optical module may constitute a bi-directional optical module for a single fiber. The receiver optical module may also include an individual lens and may constitute the focused beam coupling system by the PD, the individual lens in the receiver optical device (hereafter denoted as ROD), the condenser lens and the optical fiber.

Another optical module according to an aspect of the present invention, which communicates with a single optical fiber by the focused beam coupling system, comprises a first transmitter optical device (hereafter denoted as TOD), a second TOD, and a wavelength division multiplex (hereafter denoted as WDM) filter and a condenser lens. The first TOD provides a first LD that emits light with a first specific wavelength $\lambda_1$ and a first individual lens where one of its beam waists is aligned with the first LD. The second TOD also provides a second LD that emits light with a specific wavelength $\lambda_2$ but different from the first wavelength $\lambda_1$ and a second individual lens where one of its beam waists is also aligned with the second LD. The WDM filter may multiplex light coming from the first TOD with light coming from the second TOD. The condenser lens optically couples the WDM filter with the optical fiber such that one of beam waists thereof is aligned with the end of the optical fiber. A feature of the optical module is that the other beam waist of the condenser lens is aligned with the other beam waist of the first individual lens in the first TOD and with the other beam waist of the second individual lens in the second TOD; thus, the focused beam coupling system may be performed between the first and second LDs and the optical fiber through the first and second individual lenses, the WDM filter and the condenser lens.

The condenser lens may have the image magnification of unity, which may facilitate the optical coupling procedures. The optical module may further provide an optical isolator between the optical fiber and the condenser lens to prevent stray light from entering the first and second LDs. The optical isolator may be a type of the polarization independent isolator.

The optical module may further provide a first coupling unit that installs the condenser lens and the WDM filter. The first coupling unit may have the first outer wall to attach the optical fiber thereto through the sleeve, the second outer wall facing the first outer wall and in parallel thereto to attach the first TOD, and the third outer wall in perpendicular to the first and second outer walls to attach the second TOD thereto. In this arrangement, the WDM filter makes a half right angle to the optical axis of the condenser lens, that of the first TOD, and that of the second TOD. Moreover, the beam waist of the condenser lens is aligned on the first outer wall; the other beam waist of the condenser lens may be aligned with the other beam waist of the first individual lens at the second outer wall and with the other beam waist of the second individual lens at the third outer wall.

In another arrangement of the optical module, the other beam waist of the condenser lens may be aligned with said other beam waist of the first individual lens and said other beam waist of the second individual lens at a surface of the WDM filter. The first and second TODs may emit light with same polarization direction with respect to the incident plane of the WDM filter, that is, when the first TOD emits light with the P-polarization, the second TOD emits light with also the P-polarization; where the P-polarization means that the polarization direction of the light entering the WDM filter is within the incident plane. On the other hand, the first TOD emits light with the S-polarization; the light coming from the second TOD also shows the S-polarization.

When the LD in the first and second TODs have an edge-emitting type, the adjustment of the polarization direction of the light may be easily performed because the light emitted from the edge-emitting type LD shows the polarization in parallel to a direction to which the active layer thereof extends.

The optical module may further provides third and fourth TODs each providing an LD that emits light with a specific wavelength but different from others and an individual lens, another WDM filter for multiplexing the light coming from the third TOD with the light coming from the fourth TOD, and a coupler for multiplexing light coming from the WDM filter with the light coming from the other WDM filter. In this optical module, the other beam waist of the condenser lens is aligned with the beam waist of the third individual lens and that of the fourth individual lens at a surface of the other WDM filter.

The other WDM filter may be installed in a subsidiary coupling unit which is attached to the fourth outer wall which is perpendicular to the first and second outer walls, of the former coupling unit. The third TOD is attached to an outer wall of the subsidiary coupling unit facing the fourth outer wall of the former coupling unit, and the fourth TOD is attached in another outer wall perpendicular to the fourth outer wall of the former coupling unit. Thus, the optical axis of the third TOD and that of the fourth TOD may make a half right angle with respect to the other WDM filter. The light coming from the third TOD and the light coming from the fourth TOD may have the same polarization direction with respect to the incident plane of the other WDM filter; but the light coming from the WDM filter and that coming from the other WDM filter may make a right angle with respect to the incident plane of the optical coupler. In a case where the first to fourth wavelengths have a relation of $\lambda_1<\lambda_3<\lambda_2<\lambda_4$, the multiplex of light may be effectively performed even when a span between wavelengths is narrow enough.

BRIEF DESCRIPTION OF DRAWINGS

Non-limiting and non-exhaustive embodiments of the present invention will be described with reference to the following figures, wherein like reference numerals refer to like parts throughout the various figures unless otherwise specified.

DESCRIPTION OF EMBODIMENTS

Next, preferred embodiments according to the present invention will be described as referring to accompanying drawings. FIGS. 1 to 5 illustrate an optical coupling arrangement provided in at least an optical module that provides only transmission optical subassemblies.

Figure 1:
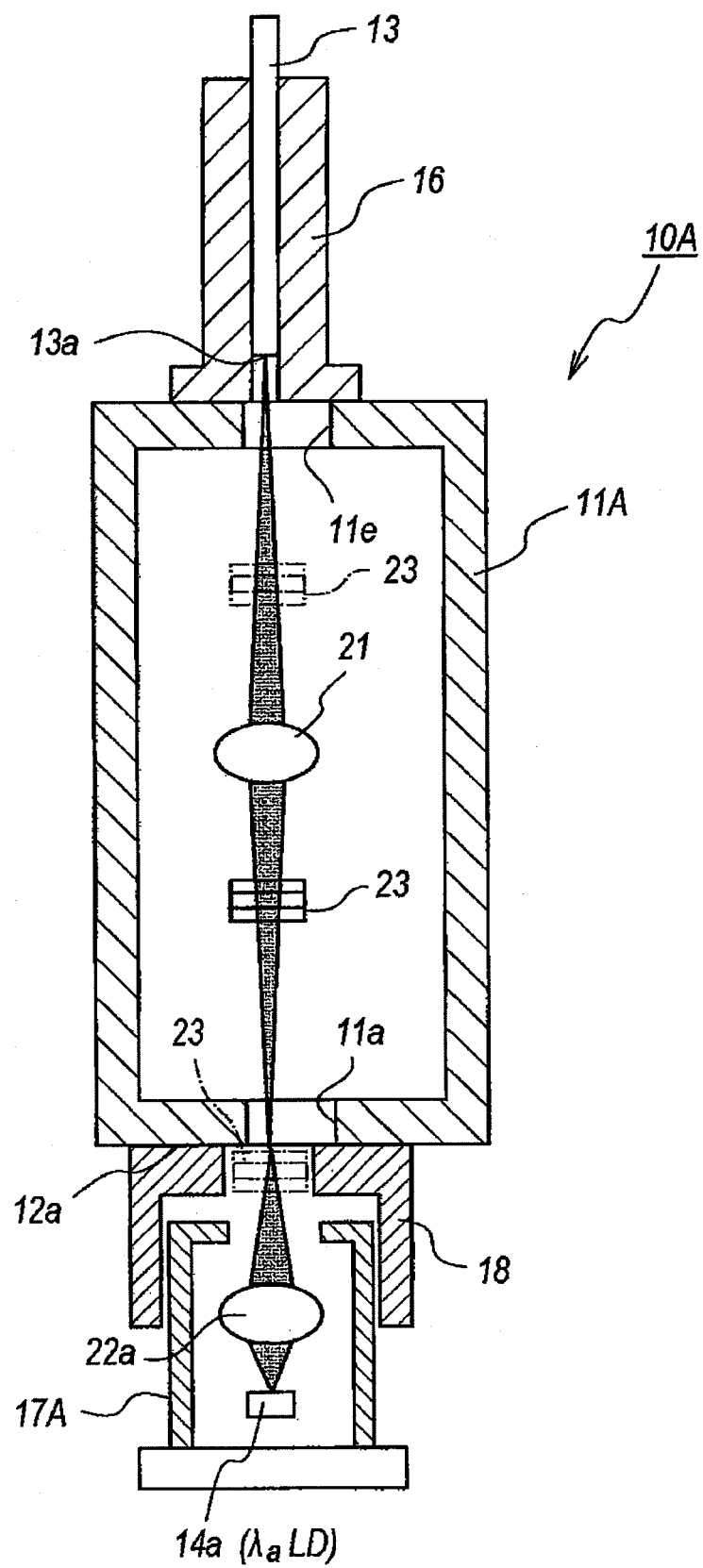
FIG. 1 shows a focused beam coupling system in an optical module according to an embodiment of the invention, where the optical module provides one TOD.

FIG. 1 shows a fundamental arrangement of an optical module according to an embodiment of the present invention, in which the optical module 10A includes a single fiber 13, a single transmitter optical device (hereafter denoted as TOD) 17A, and a coupling unit 11A. The optical module 10A attaches a sleeve 16 that secures the optical fiber 13 in an end of the coupling unit 11A, while, it fixes the TOD 17A to another end of the coupling unit 11A. The coupling unit installs a condenser lens 21, where one of its beam waist locates on the end 13a of the optical fiber 13, while the other of beam waist substantially locates on the end wall 12a of the coupling unit 11A to which the TOD 17A is fixed. The beam waist means that light emitted from a substantial source with a limited area can not concentrate on a point by a condenser lens but becomes the narrowest at the position of the beam waist along the optical axis connecting the light source to the center of the lens.

The TOD 17A provides an individual lens 22a, where one of its beam waists locates on the light emitting wall of the LD 14a while the other of its beam waists substantially locates on the end wall 12a of the coupling unit 11A. Thus, the individual lens 22a may optically couple with the condenser lens 21 at the beam waist on the wall 12a through an aperture 11a formed in the coupling unit 11A.

An optical isolator 23 may be arranged on a path between the end 13a of the optical fiber 13a and the LD 14a. Specifically, the optical isolator 23 is put between the condenser lens 21 and the position of the beam waist of the individual lens 22a in the TOD 17A in FIG. 1. The optical isolator may be set between the condenser lens 21 and the optical fiber 13; or between the individual lens 22a and the beam waist by the other lens as shown by a chain line in FIG. 1.

The optical coupling unit 11A provides a metal housing, where the condenser lens 11A may be physically set within the housing of the coupling unit 11A. Specifically, the coupling unit 11A arranges the condenser lens 21 in a center potion thereof under a condition of the image magnification of unity, while, one end thereof attaches the sleeve 16 thereto. The sleeve 16 may be optically aligned on the end wall to which the sleeve 16 is attached in a plane perpendicular to the optical axis of the optical fiber 13 and attached to the wall by welding or by an adhesive. The physical dimensions of the coupling unit 11A and that of the sleeve 16 may determine the position of the sleeve 16 on the wall. The axis of the optical fiber 13 is sometimes offset from the center axis of the condenser lens 21.

Attaching the sleeve 16 to the coupling unit, setting the condenser lens 21 and the optical isolator 23 within the coupling unit, an intermediate product of the coupling unit 11A with the sleeve 16 may be formed. Then, the coupling unit 11A assembles the TOD 17A thereto in the other end thereof. The individual lens 22a may be an aspheric lens with the image magnification of six (6), which shows a working distance to the LD 14a of about 0.25 mm. The working distance means a distance from the end of the lens to a wall of an object. The TOD 17A may be attached to the coupling unit 11A through a joint sleeve 18. Sliding the joint sleeve 18 on the end wall 12a, the TOD 17A may be aligned in a plane perpendicular to the optical axis, while, adjusting the insertion depth of the TOD 17A into a bore of the joint sleeve 18 may optically align the TOD 17A along the optical axis. The alignment of the TOD 17A with respect to the coupling unit 11A may be carried out as the LD 14a is practically activated by supplying a bias current thereto and monitoring the light output from the optical fiber 13.

In the optical alignment, the beam waist caused by the condenser lens 21 is set so as to locate on the end wall 12a; accordingly, the beam waist of the individual lens 22a in the TOD 17A may refer to the position of the beam waste on the end wall 12a, which may not only accelerate the optical alignment procedures but enhance the preciseness of the optical coupling between the TOD 17A and the coupling unit 11A. The TOD 17A may be attached to the J-sleeve 18 by the welding or by an adhesive; and the J-sleeve 18 may be fixed to the coupling unit 11A also by the welding or by an adhesive.

Figure 13:
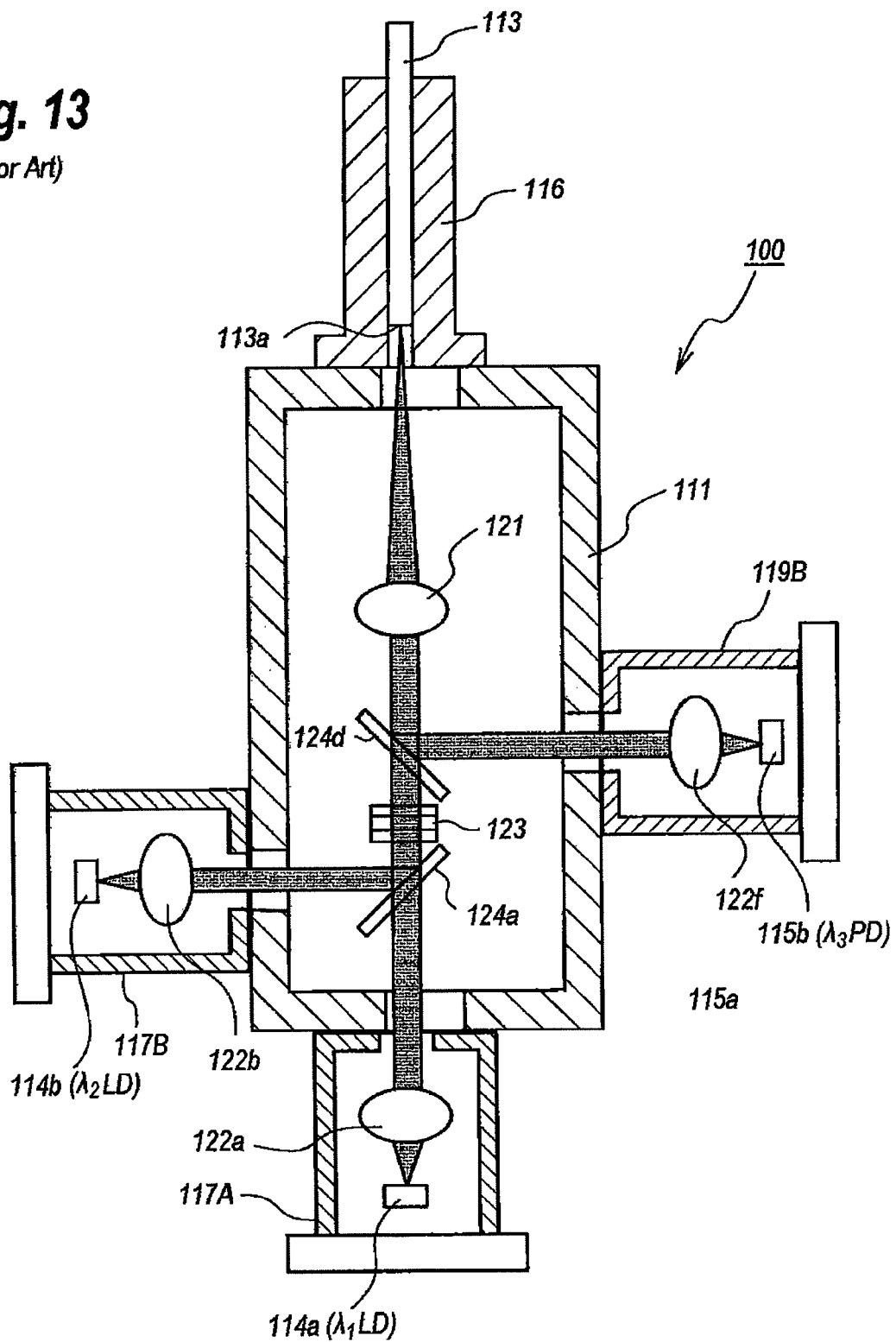
FIG. 13 shows an example of a parallel beam coupling system.

In the optical module 10A shown in FIG. 1, the light emitted from the LD 14a, which has a wavelength of $\lambda a$, enters the end 13a of the optical fiber 13 passing through the optical isolator 23 and two lenses, 21 and 22a. The optical module 10A of the present embodiment may reduce the optical coupling loss between the optical fiber and the TOD 17A due to the optical misalignment. Specifically, the optical module 10A achieves the coupling loss not more than 0.2 dB for the misalignment within ±30 μm of the TOD 17A. As illustrated in FIG. 13, a conventional optical module implemented with the parallel beam configuration is necessary to suppress the misalignment of the TOD within ±3 μm for reducing the optical coupling loss no more than 0.2 dB.

Figure 2:
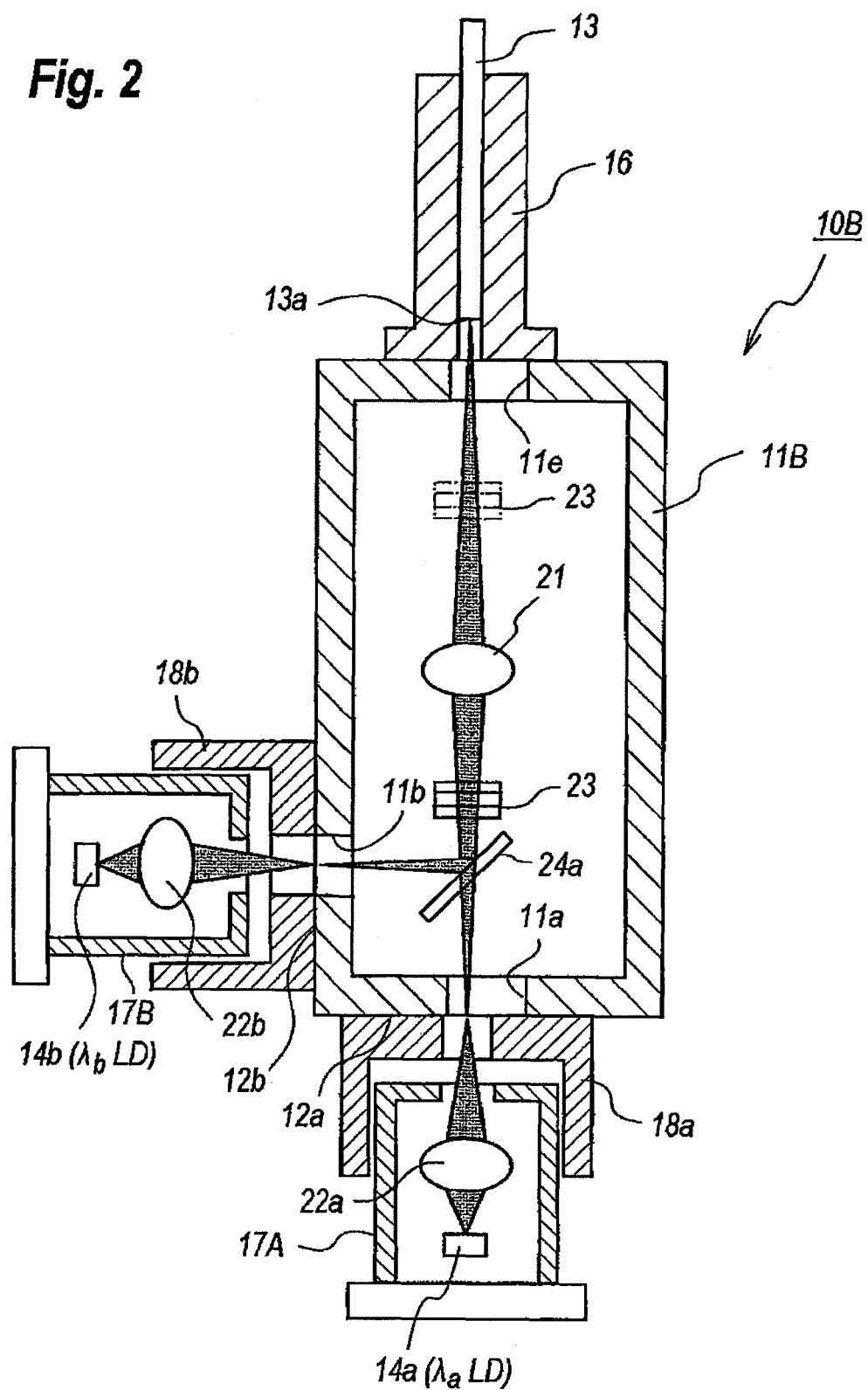
FIG. 2 shows a focused beam coupling system in another optical module according to an embodiment of the invention, where the optical module provides two TODs.

FIG. 2 shows an arrangement of an optical module 10B according to the second embodiment of the present invention, where the optical module 10B includes a single fiber 13 and two TODs, 17A and 17B, each emitting light with specific wavelength different from others.

The second TOD 17B is attached to a side of the coupling unit 11B. The optical module 10B also provides the sleeve 16, in which the optical fiber 13 is secured, attached to the end of the coupling unit 11B by the welding or by an adhesive, a TOD 17A implemented with an LD 14a having the specific wavelength of λa in the other end 12a opposite to the former end, and another TOD 17B implemented with another LD 14b having the specific wavelength λb in the side wall 12b of the coupling unit 11B. The coupling unit 11B provides the condenser lens 21, the optical isolator 23, and a WDM filter 24a therein.

The optical isolator 23 may be also arranged in the optical path between the condenser lens 21 and the optical fiber 13 as illustrated in a chain line in FIG. 2. Alternatively, the optical module JOB may provide two optical isolators, one of which is arranged in the path from the first LD 14a to the WDM filter 24a, while, the other may be arranged in the path from the second LD 14b to the WDM filter 24a.

The optical path drawn from the condenser lens 21 may be divided into two paths, one of which heads to the first TOD 17A, while, the other path heads to the second TOD 17B bent in substantially right angle by the WDM filter 24a. Respective paths provide a position of the beam waist on respective outer walls, 12a and 12b. The second TOD 17B also provides the second lens 22b and the LD 14b. One of the beam waists of the second lens 22b positions on the light emitting point of the LD 14b, while, the other beam waist is on the wall 12b of the coupling unit 11B. In other words, the second TOD 17B is optically aligned with respect to the coupling unit 11B such that the other beam waist locates on the outer wall 12b of the coupling unit 11B.

The second lens 22b in the second TOD 17B may be also an aspheric lens with the image magnification of three (3), which brings the working distance for the second LD 14b of about 0.45 mm. The second TOD 17B may be attached to the coupling unit 11B interposing the other J-sleeve 18b. The J-sleeve 18b may be optically aligned with the coupling unit in the directions perpendicular to the optical axis, while, the second TOD 17B may be aligned with the J-sleeve 18b along the optical axis by adjusting an overlapping distance with the bore of the J-sleeve 18b. The J-sleeve 18b is fixed to the coupling unit 11B, and the second TOD 17B may be fixed to the J-sleeve 18b each by the welding or by an adhesive. The optical alignment of the second TOD 17B, similar to those of the first TOD 17A, may be carried out by practically activating the LD 14b in the second TOD 17B and monitoring the light through the optical fiber 13.

The TOD 17A, same as the TOD 17A in the first embodiment shown in FIG. 1, optically couples through the aperture 11a with the coupling unit such that the beam waist of the first lens 22a substantially aligns with the beam waist of the condenser lens 21. The light with the specific wavelength of λa emitted from the first LD 14a enters the optical fiber 13 by passing through the aperture 11a, the WDM filter 24a, the isolator 23 and the condenser lens 21. While, the light with the specific wavelength of λb enters the optical fiber 13 by passing through the aperture 11b, being reflected by the WDM filter 24a, and passing through the optical isolator 23 and the condenser lens 21.

Figure 3:
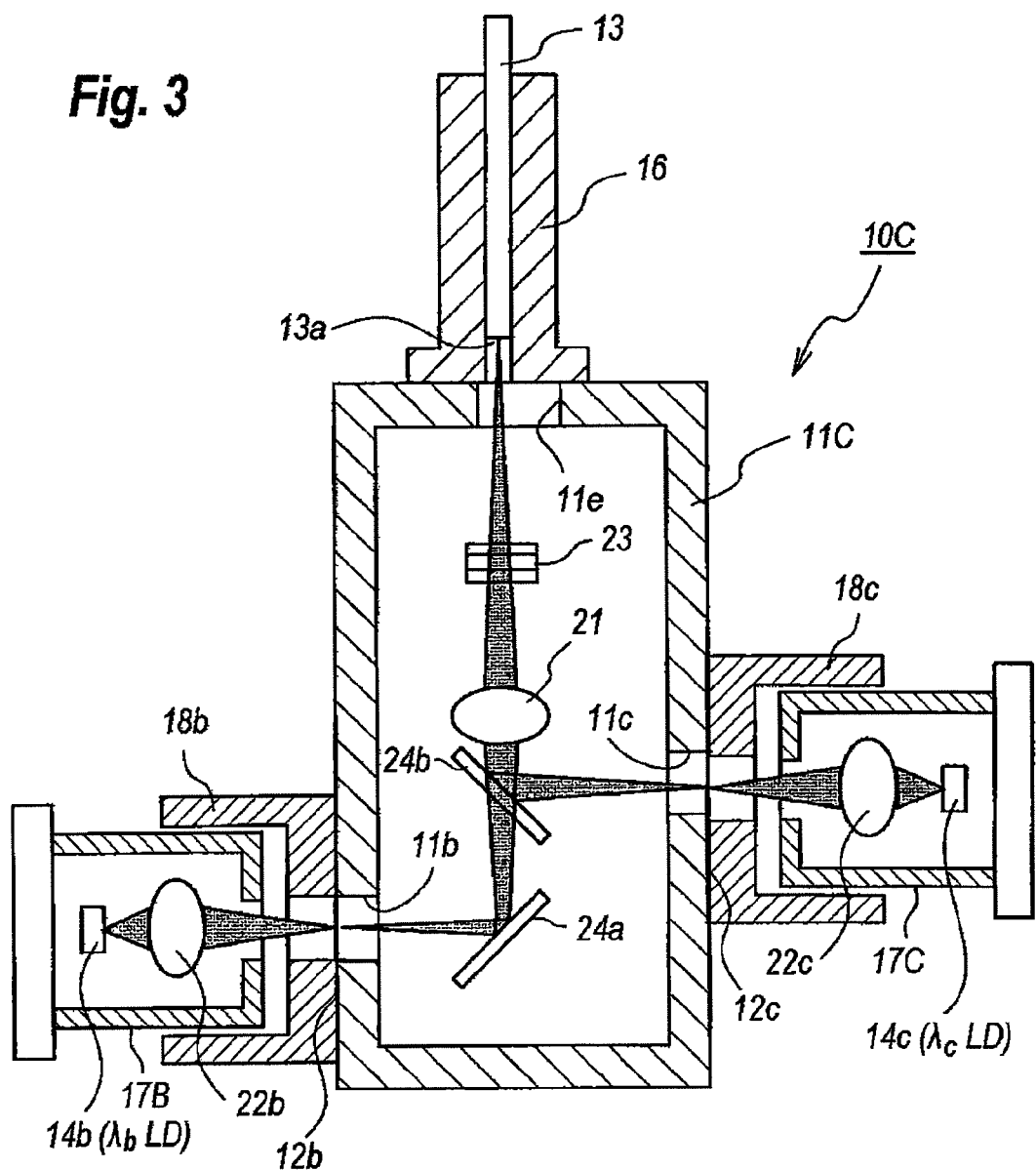
FIG. 3 shows a focused beam coupling system in still another optical module which provides two TODs but arranged in positions facing to the others.

FIG. 3 shows an optical arrangement of an optical module 10C according to the third embodiment of the invention, where the optical module 10C is a type of a transmitter optical module that provides an optical fiber 13 and two TODs, 17B and 17C, arranged in respective sides of the coupling unit 11C. Because two TODs, 17B and 17C, are arranged in the sides, a longitudinal size of the optical module 10C may be reduced. Similar to former optical modules, 10A and 10B, the optical module 10C of the present embodiment attaches the sleeve 16 that secures the optical fiber 13 therein to one end of the coupling unit 11C, while, one side wall thereof implements the first TOD 17B with the specific wavelength λb, and the other side wall opposite to the former one implements the second TOD 17C with the specific wavelength λc. The coupling unit 11C installs the optical isolator 23, the condenser lens 21, and the WDM filters, 24a and 24b, but the count of WDM filter increases to two (2) comparing to the former embodiment. The optical isolator 23 may be arranged between the optical fiber and the second WDM filter 24b.

The optical axis of the condenser lens 21 is divided into two, one of which heads to the first TOD 17B passing through the second WDM filter 24b and being reflected by the first WDM filter 24a, the other of which heads to the second TOD 17C bent by the second WDM filter 24b. The position of the beam waist of the former beam heading to the first TOD 17B substantially locates on the outer wall 12b of the coupling unit 11C to which the first TOD 17B is fixed, while, the position of the beam waist of the latter beam heading to the second TOD 17C substantially locates on the other outer wall 12c to which the second TOD 17C is attached. An individual lens 22c is also set within the second TOD 17C, where a position of one of the beam waist caused by the individual lens 22c locates on the light-emitting wall of the LD 14c, while, a position of the other beam waist locates on the outer wall 12c as the second TOD 17C is attached thereto.

That is, the second TOD 17C may be aligned along the axis thereof by adjusting the insertion depth thereof into the J-sleeve 18c, while, the optical alignment in a plane perpendicular to the optical axis may be carried out by sliding the J-sleeve 18c on the outer wall 12c of the coupling unit 11C. The optical alignment of the second TOD 17C may be performed by practically emitting the LD 14c and detecting the light from the LD 14c from the optical fiber 13.

Thus, the TOD 17B may optically couple with the optical fiber 13 such that, as already described in FIG. 2, the beam waist position of the individual lens 22b may align with the position of the beam waist of the condenser lens 21, and the other TOD 17C may couple with the optical fiber 13 by aligning the beam waist position of the individual lens 22c with the beam waist position of the condenser lens 21. The light emitted from the LD 14b with the specific wavelength of λb passes through the aperture 11b, is reflected by the first WDM filter 24a, transmits through the second WDM filter 24b and the condenser lens 21, and finally enters the end 13a of the fiber 13. The other light from the LD 14c with the specific wavelength of λc passes through the aperture 11c, is reflected by the second WDM filter 24b, transmits through the condenser lens, and finally couples with the end 13a of the fiber 13.

Figure 4:
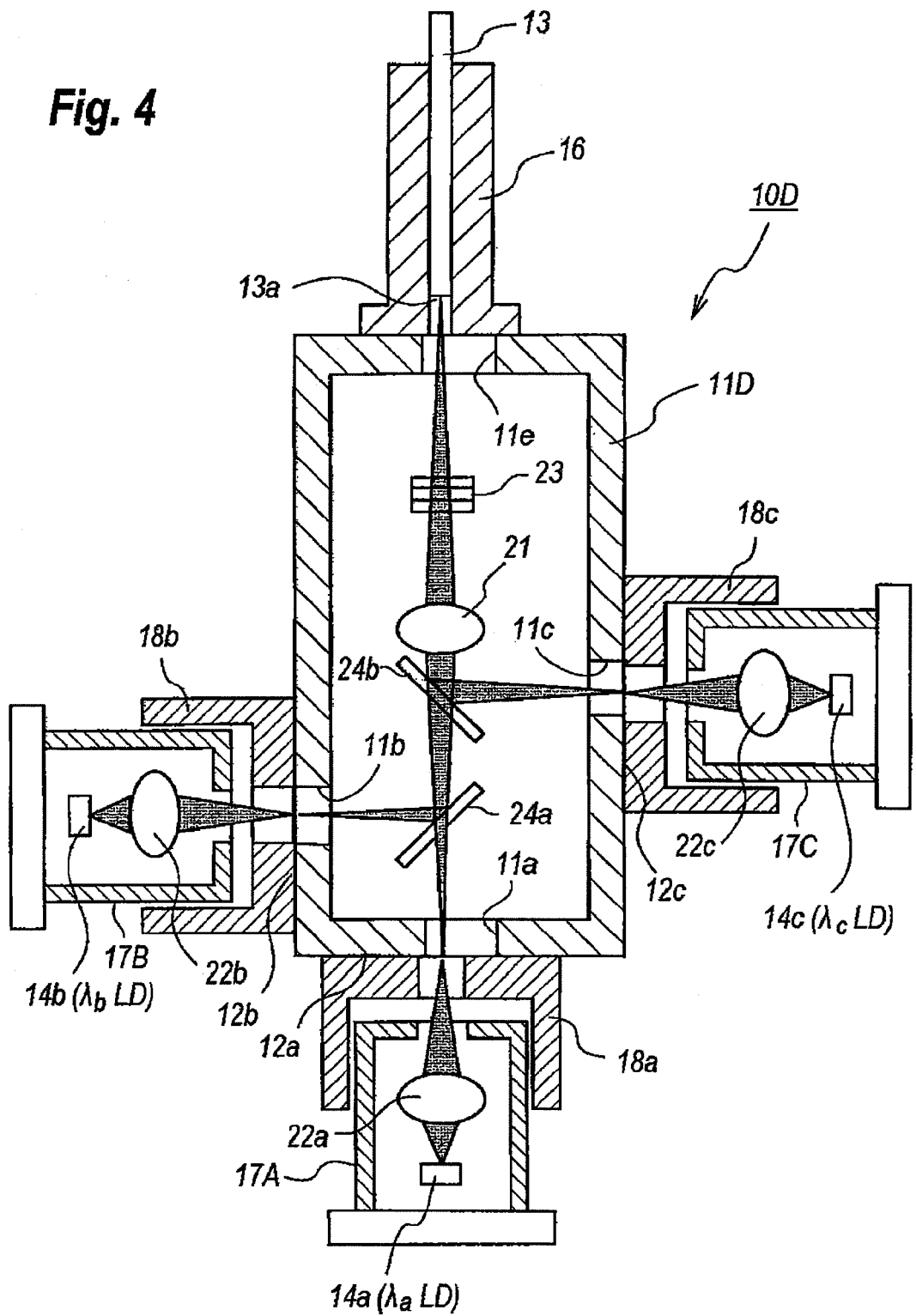
FIG. 4 shows a focused beam coupling system in still another optical module which provides three TODs each arranged in respective outer walls of the coupling unit.

FIG. 4 shows still another optical arrangement of an optical module according to an embodiment of the invention. The optical module shown in FIG. 4 provides a single fiber 13, three (3) TODs, 17A to 17C, and a coupling unit 11D. The optical module 10D of the present embodiment provides a single fiber secured in a sleeve 16 which is attached to an end wall of the coupling unit 11D, a first TOD 17A including an LD 14a with the specific wavelength of λa in an outer wall 12a of the coupling unit 11D opposite to the former wall, a second TOD 17B with an LD 14b whose specific wavelength is λb in the second wall 12b, and a third TOD 17c with an LD 14c of the specific wavelength λc in the last wall 12c. Thus, three TODs, 17A to 17C, and the sleeve 16 are fixed to the coupling unit 11D so as to face each other.

The coupling unit 11D installs, similar to those appeared in the last example, an optical isolator 23 and two WDM filters, 24a and 24b. The optical isolator 23 may be arranged in any position between the optical fiber and the second WDM filter 24b. The optical axis of the condenser lens 21 is divided in three (3), one of which heads to the first TOD 17A transmitting through the first and second WDM filters, 24a and 24b, while rests of which are, similar to the last embodiment, head to the second TOD 17B reflected by the first WDM filter 24a and to the third TOD 17C reflected by the second WDM filter 24b. Moreover, the positions of the beam waist along the respective optical axes are substantially set on the outer walls, 12a to 12c.

Respective TODs, 17A to 17C, provide an individual lens, 22a to 22c, each optically coupled with the condenser lens 21 through the aperture, 11a to 11c. The TODs, 17A to 17C may be optically aligned in three directions perpendicular to the others, and fixed to the coupling unit 11D by the welding or with an adhesive. The light emitted from the first LD 14a with the specific wavelength of $\lambda a$ transmits through the first and second WDM filters, 24a and 24b, transmits through the condenser lens 21, and finally enters the end 13a of the optical fiber 13. The light from the second LD 14b which has the specific wavelength $\lambda b$ also enters the end 13a of the optical fiber 13 after being reflected by the first WDM filter 24a first, and transmitting through the second WDM filter 24b and the condenser lens 21 secondly. The light from the third LD 14c with the specific wavelength $\lambda c$ also enters the end 13a of the optical fiber 13 after being reflected by the second WDM filter 24b first and transmitting through the condenser lens 21 secondly. In this embodiment shown in FIG. 4, the beam waist of the individual lens 22a of the first TOD 17a locates substantially on the outer wall 12a of the coupling unit 11D, that of the second individual lens 22b locates on the second outer wall 12b, and that of the third individual lens 22c locates on the third outer wall 12c. Respective J-sleeves, 18a to 18c, may align the position of the beam waist of respective individual lens such that the LDs, 14a to 14c, are practically activated by supplying the bias current and the light from the LDs, 14a to 14c, is monitored through the optical fiber 13.

Figure 5:
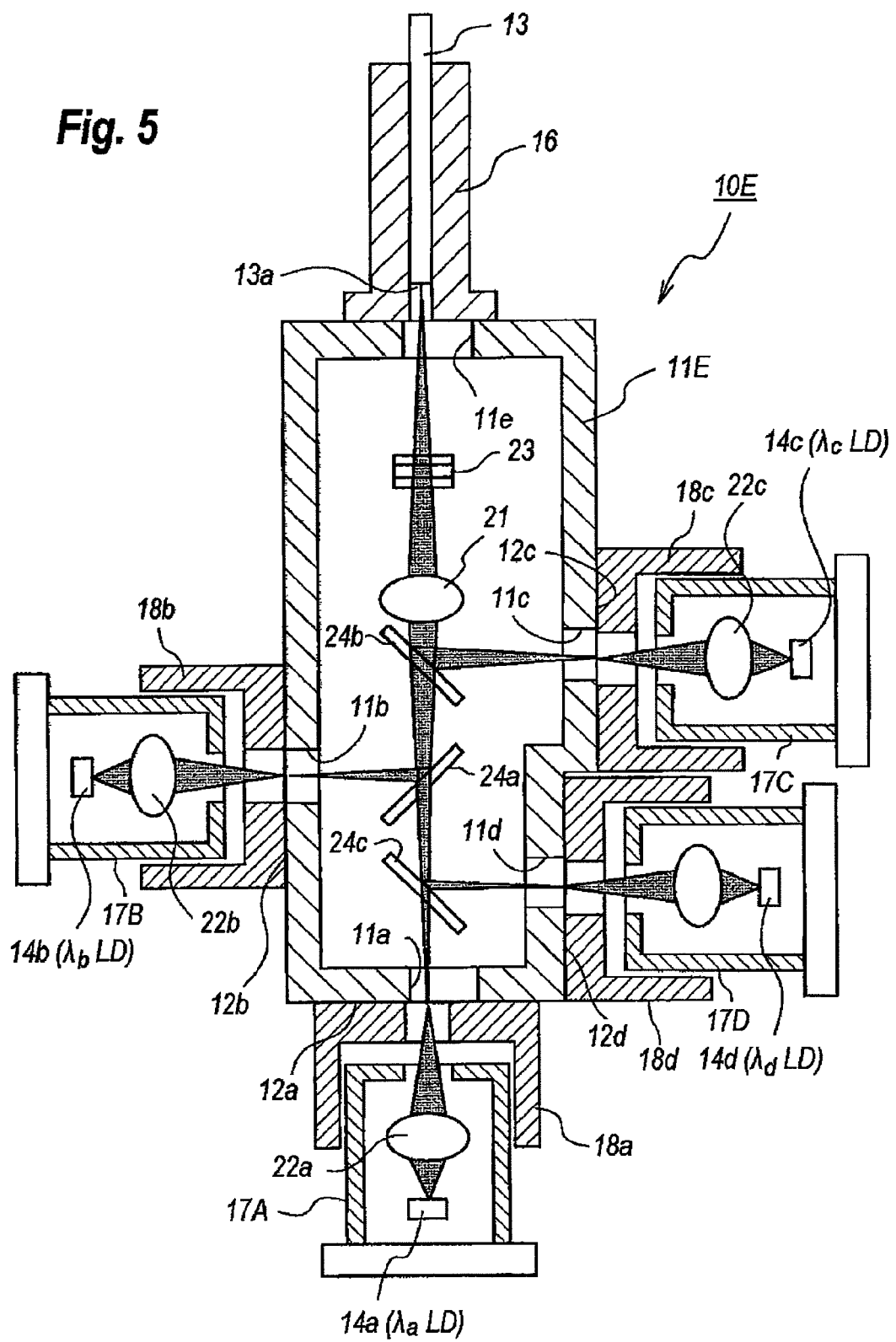
FIG. 5 shows a focused beam coupling system in still another optical module which provides four TODs.

FIG. 5 further shows an optical coupling system of an optical module according to still another embodiment of the invention. The optical module 10E shown in FIG. 5 provides four TODs, 17A to 17D, each outputting the light with a specific wavelength different from others. The optical module 10E further provides the coupling unit 11E with a step in one wall thereof. Two walls, 12c and 12d, putting the step therebetween mount the third TOD 17C and the fourth TOD 17D, respectively. Thus, the step may adjust the length of the optical path of the condenser lens 21.

Describing in detail, the optical axis of the condenser lens 21 is divided into four (4) each providing the beam waist point substantially heading to the outer wall, 12a to 12d, of the optical coupling unit 11E to which the TOD, 17A to 17D, is fixed. Optical path lengths from the condenser lens 21 to respective outer walls, 12a to 12d, are substantially equal to the others; accordingly, the step is necessary between the third and fourth walls, 12c and 12d. Individual lends, 22a to 22d, in respective TODs, 17A to 17D, may have the beam waist point substantially aligned with the beam waist point formed on respective walls, 12a to 12d, by the condenser lens 21; thus, the respective individual lenses, 22a to 22d, may optically couple with the condenser lens 21 through the apertures, 11a to 11d, and WDM filters, 24a to 24c.

The TODs, 17A to 17D, accompany with respective J-sleeves, 18a to 18d, to align the TODs, 17A to 17D, in three directions perpendicular to the others. The TODs, 17A to 17D, are fixed to the J-sleeves, 18a to 18d, and the J-sleeves, 18a to 18d, are fixed to respective walls, 12a to 12d, by the welding or with an adhesive after the alignment. The light coming from the first TOD 17A (the specific wavelength $\lambda a$) may couple the optical fiber 13 after transmitting through three WDM filters, 24a to 24c, and the condenser lens 21. the light coming from the second TOD 17B (the specific wavelength $\lambda b$) may couple the optical fiber after being reflected by the first WDM filter 24a first, and transmitting through the second WDM filter 24b and the condenser lens 21. The light coming from the third TOD 17C (the specific wavelength $\lambda c$) may enter the optical fiber 13 after being reflected by the second WDM filter 24b first and transmitting through the condenser lens 21 secondly. Moreover, the light coming from the fourth TOD 17D may enter the optical fiber 13 after being reflected by the third WDM filter 24c first and transmitting through the first and second WDM filters, and the condenser lens 21 secondly.

FIGS. 6 to 10 each shows an optical coupling system on an optical module according to an embodiment of the invention. The optical module shown in FIGS. 6 to 10 provides at least one receiver optical module (hereafter denoted as ROD) in addition to TODs described in the former embodiments, which constitutes a type of the single fiber bi-directional module.

The ROD 19A is substantially unnecessary to align optically along the optical axis thereof different from those of TODs. Accordingly, the ROD 19A generally accompanies with a physical structure to align along the optical axis and only two rest directions perpendicular to the optical axis are optically aligned. However, the ROD 19A may be optically aligned along the optical axis thereof similar to the TODs, 17A and 17B, such that the beam waist due to the condenser lend 21 locates on the wall 12c of the coupling unit 11F, and that caused by the individual lens to be installed in the ROD 19A substantially aligns with the beam waist of the condenser lens 21.

Figure 6:
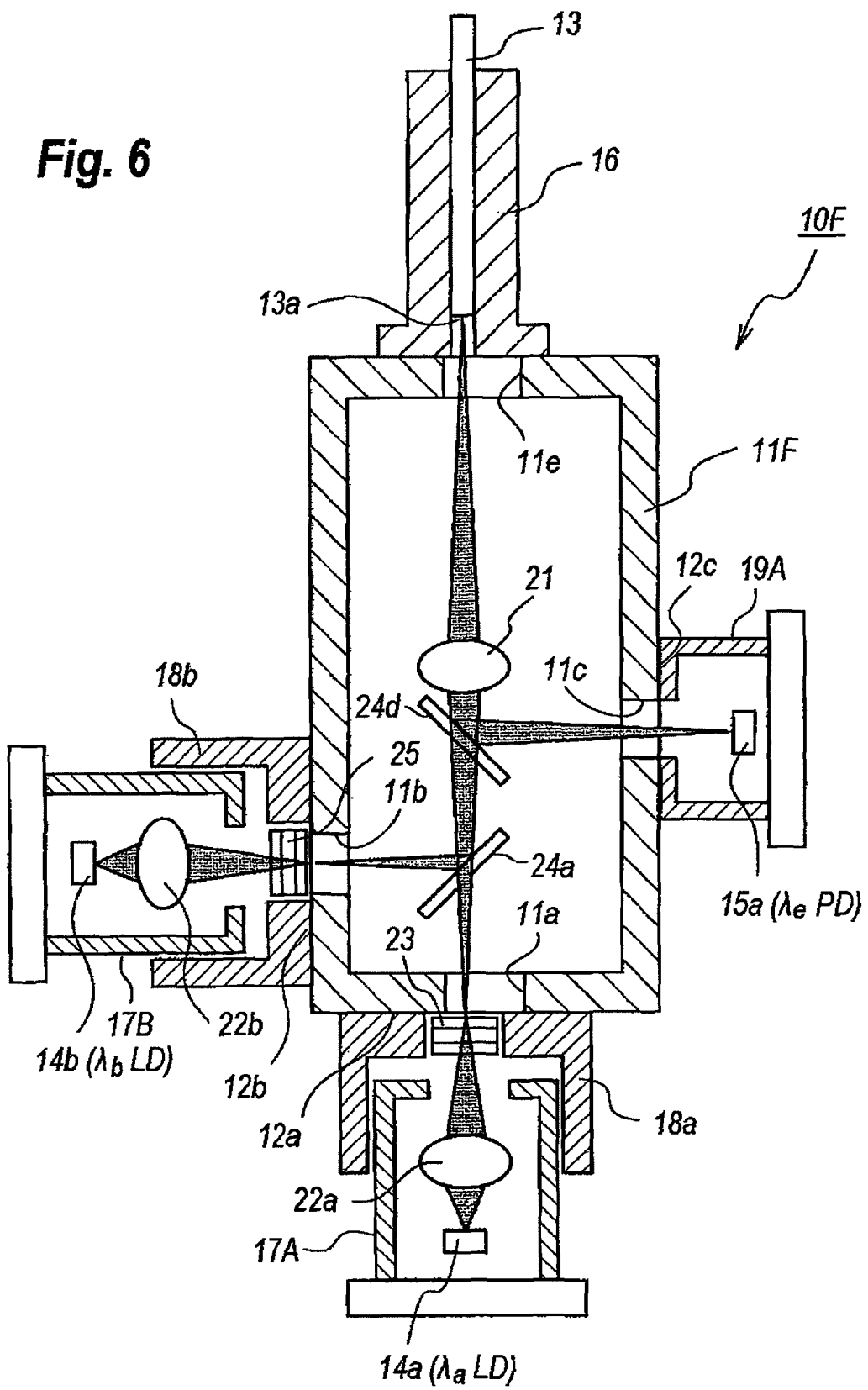
FIG. 6 shows a focused beam coupling system in still another optical module which provides two TODs and one ROD, where a PD in the ROD is set on a beam waist of the condenser lens without interposing an individual lens.
Figure 7:
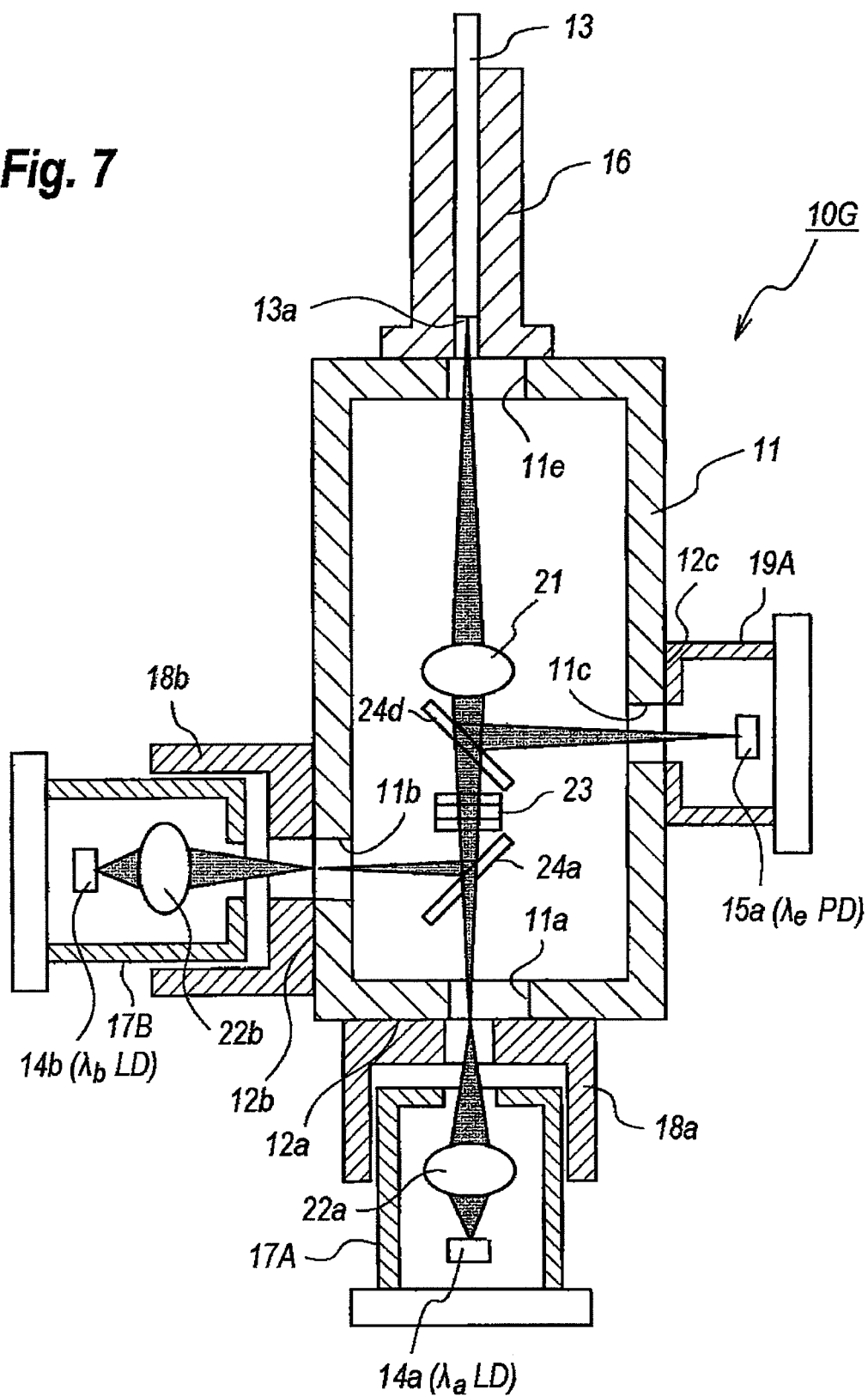
FIG. 7 shows a focused beam coupling system similar to that shown in FIG. 6, but the coupling system shown in FIG. 7 only provides an optical isolator common to two TODs.

The optical modules shown in FIGS. 6 and 7 replace the third TOD 17C of the optical module 10D shown in FIG. 4 with the ROD 19A. That is, the optical module 10F of FIG. 6 provides the ROD 19A fixed to the outer wall of the coupling unit 11F. The ROD 19A installs the PD 15a that receives signal light with the specific wavelength of $\lambda e$ directly from the condenser lens 21 without any individual lens. The ROD 19A is optically aligned in the outer wall 12c of the coupling unit for directions perpendicular to the optical axis thereof, and fixed to the coupling unit 11F by the welding or an adhesive.

A WDM filter 24d is put in the optical path from the condenser lens 21 to the ROD 19A to bend the signal light by substantially right angle, while, an isolator, 23 or 25, and a WDM filter 24a is put in respective optical paths from the condenser lens 21 to the TOD 17A and to the other TOD 17B. Thus, the ROD 19A receives the signal light with the wavelength of $\lambda e$ provided from the optical fiber 13, transmitted through the condenser lens 21 and reflected by the second WDM filter 24d. The light emitted from the first TOD 17A with the specific wavelength of $\lambda a$ transmits through the optical isolator 23, two optical isolators, 24a and 24d, and the condenser lens 21, and finally enters the optical fiber 13. The light coming from the second TOD 17B with the wavelength of $\lambda b$ transmits through the other optical isolator 25, is reflected by the second WDM filter 24d, transmits through the condenser lens 21, and finally enters the optical fiber 13. The first and second optical isolators, 23 and 25, only transmits light advancing to the first WDM filter 24a from the TOD 17A or the TOD 17B but substantially cuts the light advancing to the TOD 17A and the TOD 17B from the second WDM filter 24d.

An optical module 10G shown in FIG. 7 differs in the position of the optical isolator 23 from those installed in the former optical module 10F shown in FIG. 6 to eliminate the count of the optical isolator. The optical module 10G provides the optical isolator 23 between two WDM filters, 24a and 24d. In this optical module 10G, the light emitted from the first TOD 17A first transmits through the WDM filter, the optical isolator 23, the second WDM filter 24d and the condenser lens 21, and finally enters the optical fiber 13; while, the light coming from the second TOD 17B is firstly reflected by the WDM filter 24a, subsequently transmits through the optical isolator 23, the second WDM filter 24d and the condenser lens 21, and finally enters the optical fiber 13. The optical isolator 23 shown in FIG. 7 may transmit light advancing to the second optical isolator 24d from the first optical isolator 24a but cuts light advancing to the first WDM filter 24a from the second WDM filter 24d.

Figure 8:
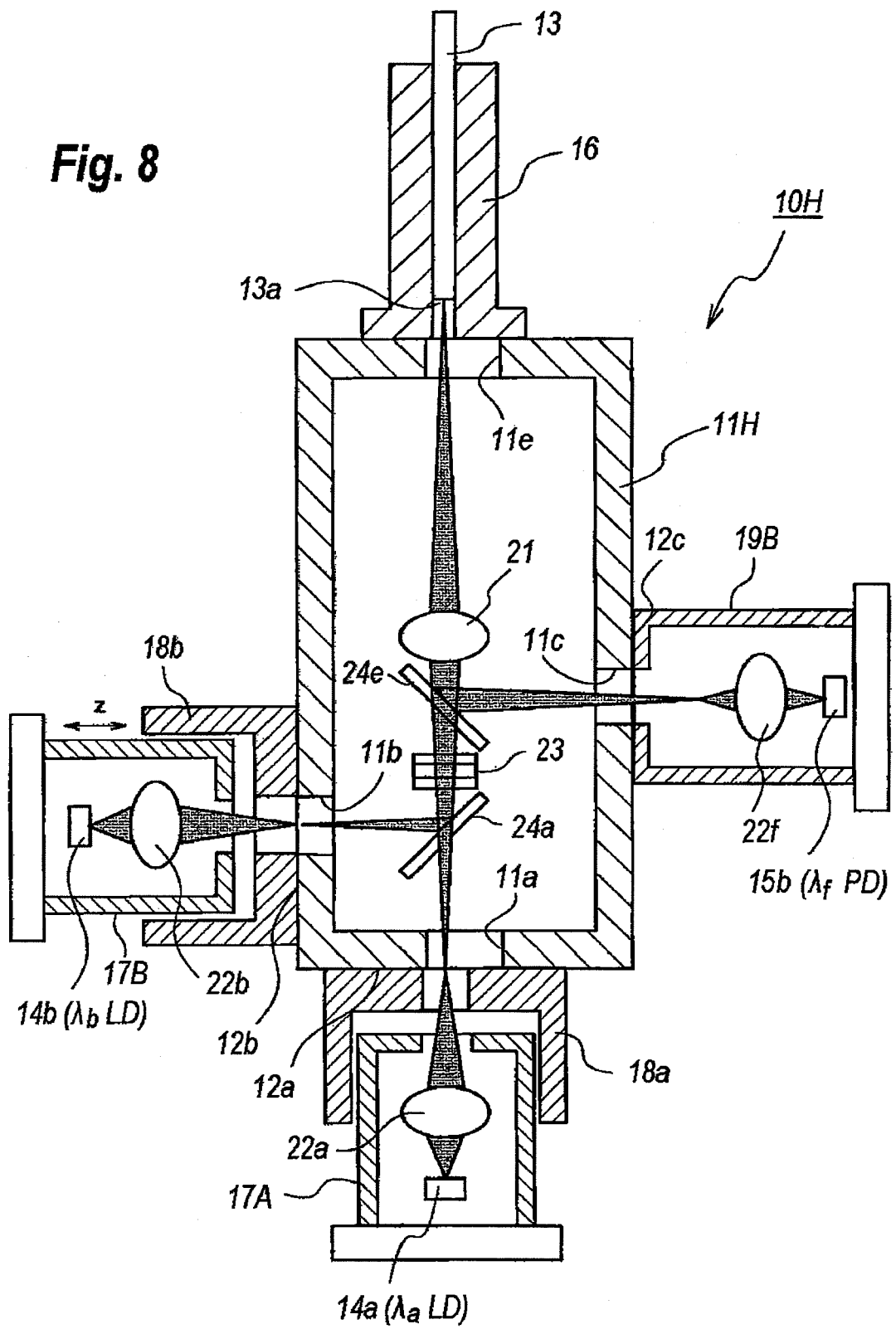
FIG. 8 shows a focused beam coupling system similar to that shown in FIG. 7, but the beam waist of the condenser lens is aligned with the beam waist of the individual lens installed in the ROD.

FIG. 8 shows an optical coupling system of still other optical module 10H. This optical module shown in FIG. 8 differs in the configuration of the ROD 19B from the ROD 19A in the aforementioned modules, 10F and 10G. The ROD 19B of the present embodiment provides an individual lens 22f and receives light with the wavelength of $\lambda f$ provided from the optical fiber 13. The position of the beam waist due to the individual lens 22f locates within the ROD 19B not at the outer wall 12c of the coupling unit 11H, but substantially aligns with the beam waist caused by the condenser lens 21 in the coupling unit 11H.

The individual lens 22f in the ROD 19B may have the image magnification of two (2) which forms a work distance of about 1 mm for the PD 15b. The ROD 19B of the present embodiment may omit the optical alignment along the optical axis thereof similar to the ROD 19A of the aforementioned embodiment, and may be aligned only in a wall perpendicular to the optical axis, that is, the ROD 19B may be optically aligned within the outer wall 12c of the coupling unit 11H by practically providing test light from the optical fiber 13 and monitoring the light by the PD 15b. The second WDM filter 24e may reflect light with a wavelength of $\lambda f$ and the light is focused by the individual lens 22e.

Figure 9:
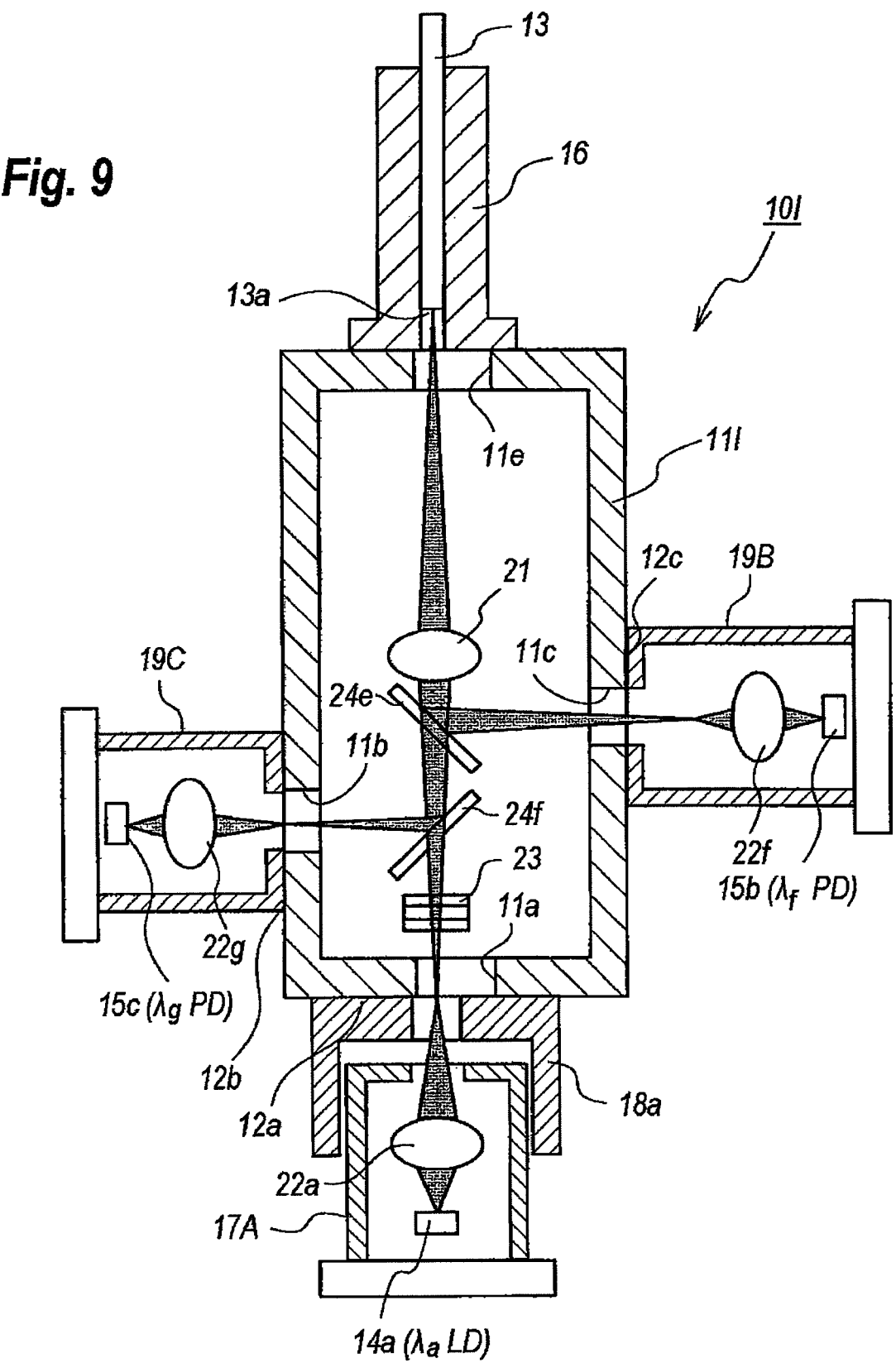
FIG. 9 shows a focused beam coupling system in still another optical module which provides one TOD and two ROD, where the beam waist of the condenser lens is aligned with the beam waist of the individual lens in the respective RODS.
Figure 10:
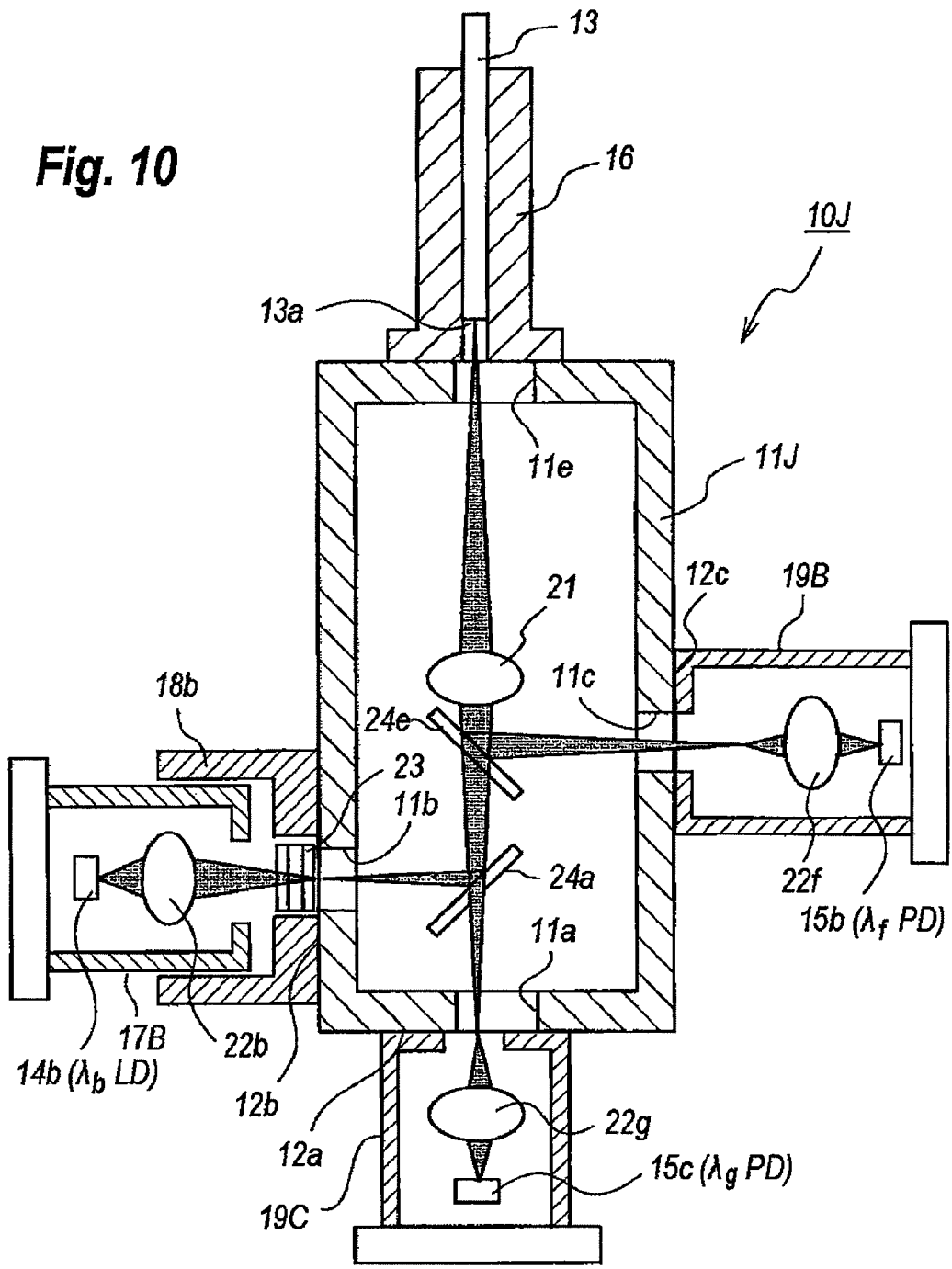
FIG. 10 shows a focused beam coupling system in still another optical module which provides two RODs and one TOD, where one of RODs faces the optical fiber.
Figure 11A:
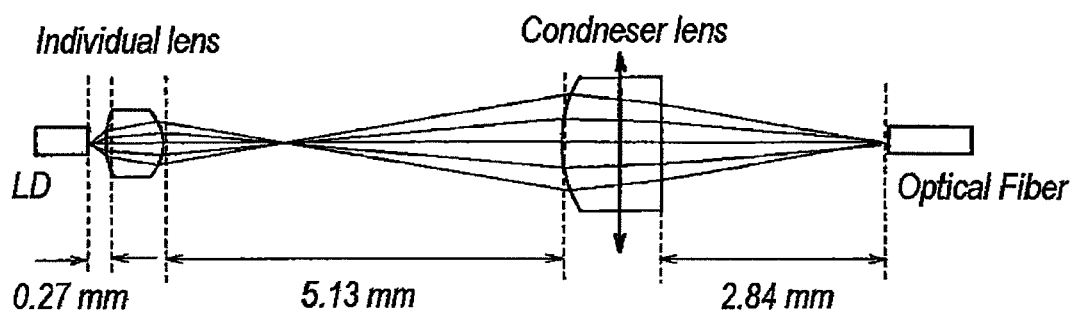
FIG. 11A schematically illustrates a focused beam coupling system assumed to estimate the coupling loss due to an offset of the condenser lens along a direction perpendicular to the optical axis.
Figure 11B:
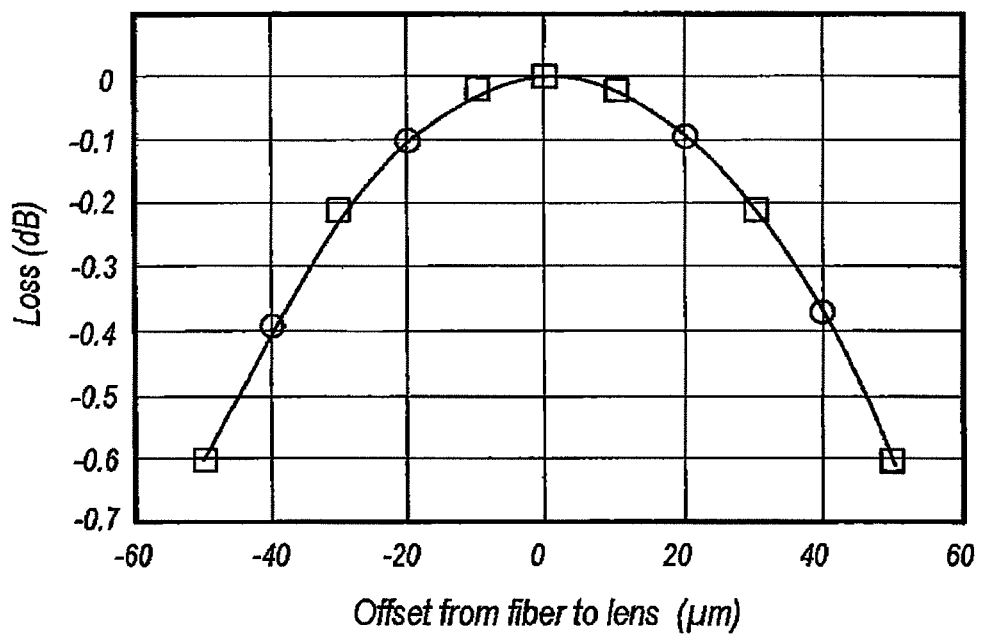
FIG. 11B shows the loss characteristic of the focused beam coupling system shown in FIG. 11A.
Figure 12A:
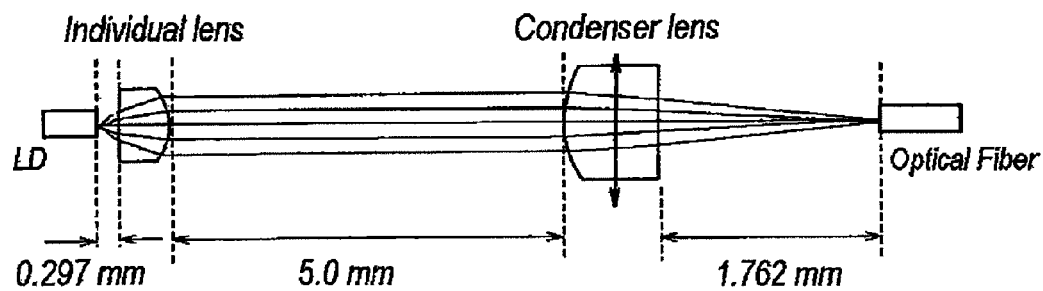
FIG. 12A schematically illustrates a parallel beam coupling system assumed to estimate the coupling loss due to an offset of the condenser lens along a direction perpendicular to the optical axis.
Figure 12B:
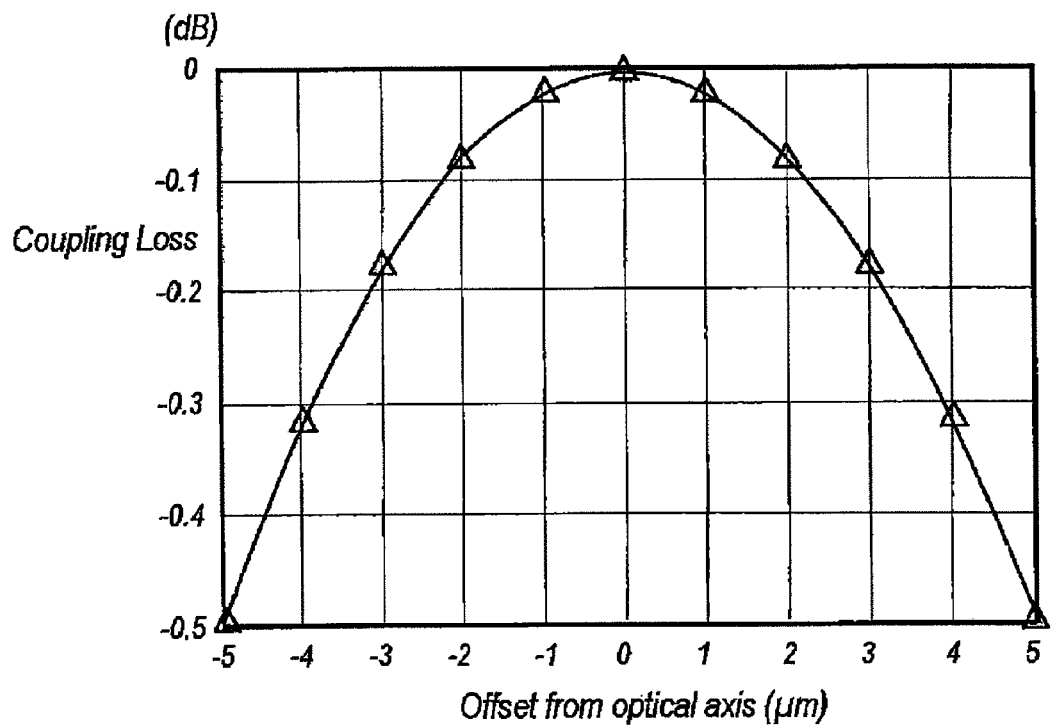
FIG. 12B shows the loss characteristic of the parallel beam coupling system.

FIGS. 9 and 10 show an optical coupling system of optical modules each providing two RODs in addition to one TOD, where respective RODs, 19B and 19C, receive light with different wavelengths from others. The optical module 10I shown in FIG. 9 replaces the second TOD 17B shown in FIG. 8 with the second ROD 19C but the optical isolator 23 is put just in front of the TOD 17A so as not to interfere the optical paths of two RODs, 19B and 19C.

The second ROD 19C receives light with a wavelength of $\lambda g$ which is different from the wavelength $\lambda f$ for the first ROD 19B by the PD 15c therein. The second ROD 19C also provides an individual lens 22g but the beam waist thereof is set so as to roughly locate on the outer wall of the coupling unit 11I same as that of the TOD 17A. The individual lens 22g in the second ROD 19C has the same arrangement with the individual lens 22f in the first ROD 19B. The second ROD 19C may also omit the optical alignment along the optical axis thereof and may align only by sliding the ROD 19C on the outer wall 12b of the coupling unit 11I. The optical alignment of the second ROD 19C may be also performed by practically providing the light having the wavelength of $\lambda g$ through the optical fiber 13 and monitoring the light by the PD 15c.

The optical module 10J shown in FIG. 10 replaces the first TOD 17A of the optical module 10H shown in FIG. 8 with a ROD 19C. The optical isolator 23 is put in the optical path from the TOD 17B to the first WDM filter 24a so as not to interfere the optical paths for the RODs, 19B and 19C. The second ROD 19C may receive the light with the wavelength of $\lambda g$ and be fixed to the outer wall 12a of the coupling unit 11J. The beam waist of the individual lens 22g in the second ROD 19C is roughly aligned with the beam waist of the condenser lens 21. The light with the wavelength of $\lambda g$ transmits through the condenser lens 21, the second and first WDM filters, 24e and 24a, and is finally condensed by the individual lens 22g to enter the PD 15c. The light emitted from the TOD 17B is first condensed by the individual lens 22b, transmits through the optical isolator 23, is reflected by the first WDM filter 24a, transmits through the second WDM filter 24e and the condenser lens 21, and finally enters the optical fiber 13.

Optical modules, 10B to 10J, according to embodiments of the present invention provides at least one optical device, ROD or TOD, which is fixed to the outer wall of the coupling unit, 11B to 11J, where the outer wall does not face the wall to which the sleeve 16 is attached. That is, at least one optical device receives or emits light bent substantially in right angle by a WDM filter. In other words, the light entering the WDM filter makes substantially a half right angle with respect to the normal line of the WDM filter.

When two light beams entering a WDM filter, one of which is to transmit through the WDM filter and the other is to be reflected by the filter, have respective specific wavelengths close to the other, the WDM may not discriminate the two light beams. That is, the WDM filter transmits a portion of light which should be essentially reflected entirely and reflects a portion of light which should by essentially transmitted entirely. Such a situation may occur in the dense WDM communication system following the ITU-T standard in the channel grid thereof which is only 0.8 nm to the neighbors. The performance of the WDM filter to distinguish two light beams degrades as the incident angle of the light beam becomes larger, where the incident angle may be defined by the angle between the light beam and the normal line of the WDM filter. Embodiments of an optical module described below may solve this subject of the wavelength discrimination of the WDM filter.

Figure 14:
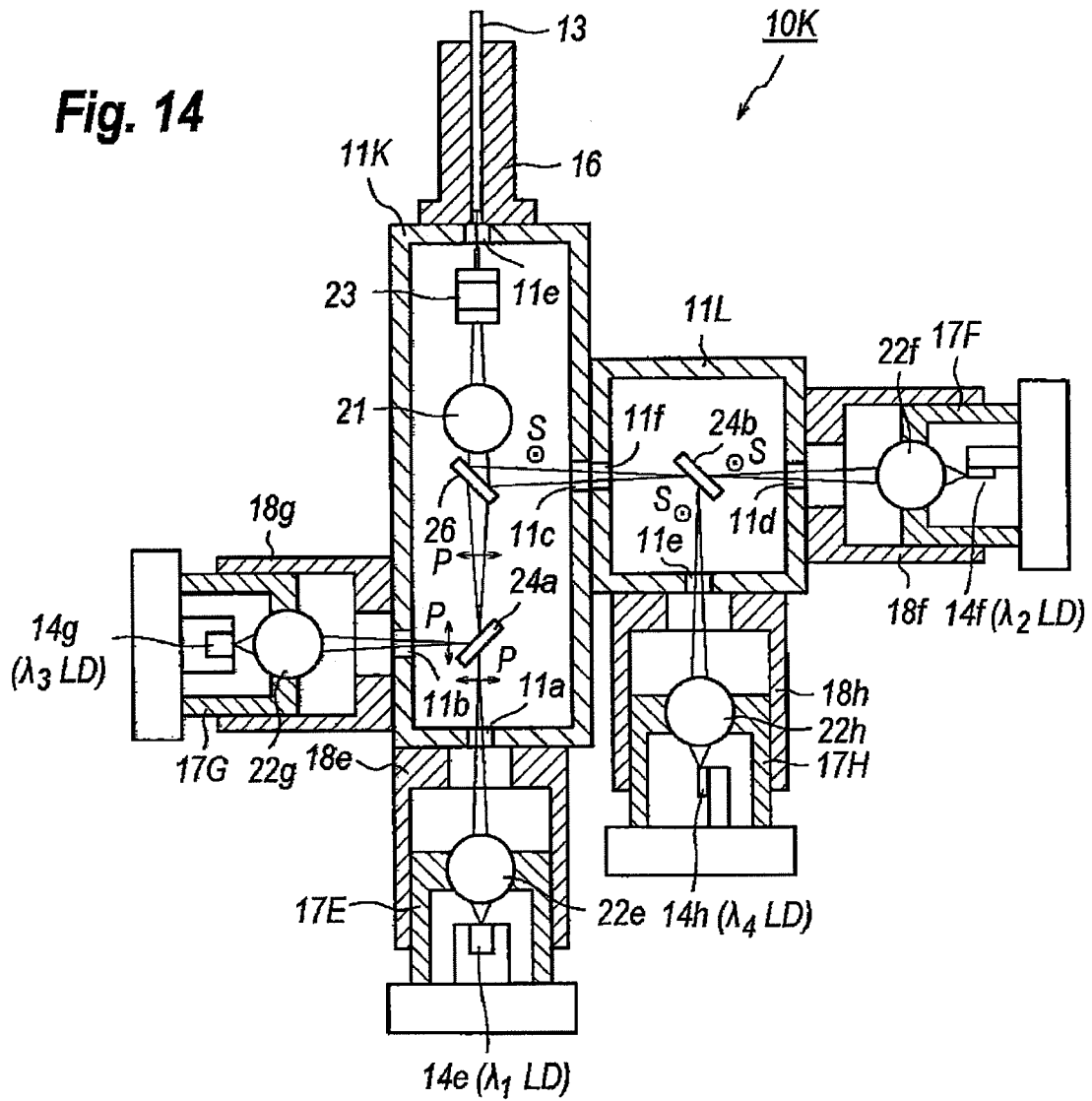
FIG. 14 shows a focused beam coupling system in still another optical module which includes four TODs each emitting light with a specific wavelength different from others, and polarization directions thereof to the WDM filter, and the optical coupler are precisely adjusted by aligning the extending direction of the active layer of the LD.

FIG. 14 shows an optical coupling system of an optical module 10K according to still another embodiment of the present invention. The optical module 10K comprises four (4) TODs, 17E to 17H, each emitting light with a specific wavelength, $\lambda_1$-$\lambda_4$, different from others but closely separated to the others. The optical module 10K include, in addition to four TODs, 17E to 17H, a primary coupling unit 11K, a subsidiary coupling unit 11L, a sleeve 16 and an optical fiber 13. The TODs, 17E to 17H, install LDs, 14e to 14g, which emit light beams, and individual lenses, 22e to 22h, respectively. The TODs, 17E to 17H, are fixed to the coupling units, 11K and 11L, interposing respective J-sleeves, 18e to 18h. The primary coupling unit 11K installs the optical isolator 23, a WDM filter 24a and a coupler 26, while, the subsidiary coupling unit 11L installs the other WDM filter 24b. The first WDM filter 24a is arranged such that the normal line thereof makes substantially a half right angle to respective light beams coming from the first TOD 17E and the third TOD 17G, respectively, while, the second WDM filter 24b is arranged such that the normal line thereof makes substantially a half right angle to two light beams coming from the second TOD 17F and the fourth TOD 17H, respectively. The coupler 26, which shows no wavelength dependence, is arranged such that the normal line thereof makes substantially a half right angle to two light beams output from the first and second WDM filters, 24a and 24b, respectively. The optical coupler 26 may be a type of a polarization coupler that couples the p-component (parallel-component) of the light multiplexed by the first WDM filter 24a with s-component (senkrecht-component) of the light multiplexed by the second WDM filter 24b.

Similar to the arrangement of the aforementioned optical module, the optical module 10K of the present embodiment provides an optical fiber 13 secured in a sleeve 16 which is attached in one wall of the primary coupling unit 11K. The primary coupling unit 11K provides, in a wall facing the wall mounting the sleeve 16, the first TOD 17E through the J-sleeve 18e which installs an LD emitting light with a specific wavelength of $\lambda_1$ and the third TOD 17G in side wall thereof through the other J-sleeve 18g which mounts an LD 14g outputting light with another specific wavelength of $\lambda_2$, which is longer than the wavelength $\lambda_1$.

A side wall opposite to the wall where the third TOD 17G is mounted provides the subsidiary coupling unit 11L, and a side wall of the subsidiary unit opposite to the wall where the primary coupling unit 11K is mounted provides a TOD 17F that installs an LD 14f with a specific wavelength of $\lambda_2$. The subsidiary coupling unit 11K also provides in a side wall perpendicular to the aforementioned wall where the second TOD 17F is mounted the fourth TOD 17H with an LD 14h that emits light with a specific wavelength of $\lambda_4$.

The primary coupling unit 11K installs the first WDM filter 24a, the coupler 26, the condenser lens 21, and the optical isolator 23, while, the subsidiary coupling unit 11L installs the second WDM filter 24b. The optical isolator 23 of the present embodiment may be a type of polarization independent isolator whose isolation is independent of the polarization direction of the incident light. The optical isolator 23 may be fixed in the primary coupling unit 11K by welding, with an adhesive, or by press-fitting. The optical isolator 23 may be arranged between the condenser lens 21 and the coupler 26.

The condenser lens 21 may have the beam waist thereof at a tip of the optical fiber 13 secured in the sleeve 16. This arrangement of the beam waist of the condenser lens 21 may be determined only through the physical dimensions of the sleeve 16 and the primary coupling unit 11K. While, the other beam waist of the condenser lens 21 is set on the surface of the first WDM filter 24a and on the surface of the second WDM filter 24b facing the primary coupling unit 11K. These optical alignments of the beam waits caused by the condenser lens 21 may be performed only by the mechanical dimensions of the components.

For respective individual lenses, 22e to 22h, one of the beam waists of the first individual lens 22e is set so as to be on the light-emitting surface of the first LD 14e, while, the other beam waist thereof is set so as to be at the surface of the first WDM filter 24a facing the first TOD 17E. For the second TOD 17F, one of the beam waists of the individual lens 22f is set so as to be on the light-emitting surface of the LD 14f, while, the other thereof is set so as to be at the surface of the second WDM filter 24b facing the second TOD 17F. For the third TOD 17G, one of the beam waists of the third individual lens 22g is set so as to be on the light-emitting surface of the LD 14g, while, the other beam waist thereof is set so as to be at the surface of the first WDM filter 24a facing the third TOD 17G. Lastly, one of the beam waists of the fourth individual lens 22h is set to be on the light-emitting surface of the LD 14h, while, the other thereof is set so as to be at the surface of the second WDM filter 24b facing the primary coupling unit 11K. The adjustment of the beam waists of respective individual lenses, 22e to 22h, so as to be on the light-emitting surface of LDs, 14e to 14h, is simply performed through the assembly of LDs, 14e to 14h, on the sub-mount in the TODs, 17E to 17H, while, the adjustment of the other beam waists thereof with respect to the WDM filters, 24a and 24b, may be precisely performed through respective J-sleeves, 18e to 18h.

That is, respective J-sleeves, 18e to 18h, may optically align the TODs, 17E to 17H, in a plane perpendicular to the optical axis by sliding the J-sleeve, 18e to 18h, on the outer surface of the coupling units, 11K and 11L, while, may align the TODs, 17E to 17H, along the optical axis thereof by adjusting the depth of the TODs, 17E to 17H, into the bore of the J-sleeve, 18e to 18h. Thus, the beam waist caused by the individual lenses, 22e to 22h, may be precisely adjusted so as to be at the surfaces of the WDM filters, 24a and 24b.

The first LD 14e with the specific wavelength of $\lambda_1$ may optically couple with the optical fiber 13 through the first individual lens 22e, the first WDM filter 24a, the coupler 26, the condenser lens 21, and the optical isolator. The second LD 14f with the wavelength of $\lambda_1$ may couple with the optical fiber 13 through the second individual lens 22f, the second WDM filter 24b, the coupler 26, the condenser lens 21, and the optical isolator 23. The second LD 14g with the wavelength of $\lambda_3$ may couple with the optical fiber 13 through the third individual lens 22g, the first WDM filter 24a, the coupler 26, the condenser lens 21, and the optical isolator 23. The fourth LD 14h with the wavelength of $\lambda_4$ may couple with the optical fiber 13 through the fourth individual lens 22h, the second WDM filter 24b, the coupler 26, the condenser lens 21, and the optical isolator 23.

One type of the polarization independent isolator includes a Faraday rotator put between birefringent crystals, such as rutile, as a half-wavelength plate. When a thickness of birefringent crystal is 0.5 mm and the light incident thereto is has a parallel beam, a walk-off distance between the ordinary beam and the extraordinary beam is about 50 µm at most. Accordingly, the optical module 10K of the present embodiment has the focused beam arrangement of the condenser lens 21 combined with respective individual lenses, 22e to 22h. Thus, the optical isolator 23 may effectively show the isolation greater than −60 dB even for the walk-offset distance of about 50 µm under a condition that the condenser lens 21 has the image magnification of unity and a distance to the optical fiber 13 to be 4.35 mm, while, the individual lens, 22e to 22h, are a aspheric lens with having a distance to its beam waist of 5.8 mm. The unity image magnification of the condenser lens 21 may effectively absorb the tolerance of the physical dimensions of the primary coupling unit 11K, to respective WDM filters, 24a and 24b, and so on.

In the optical module 10K shown in FIG. 14, the first WDM filter 24a multiplexes the P-component of the light emitted from the first LD 14e whose specific wavelength is $\lambda_1$ with the P-component of the light emitted from the third LD 14g whose specific wavelength is $\lambda_3$. When the LDs, 14e and 14g, are a type of an edge-emitting LD, the polarization direction of the light emitted therefrom is substantially in parallel to a direction where the active layer thereof extends. Accordingly, the P-component of the light may be obtained by arranging the TODs, 17E and 17G, such that the primary surface of the sub-mount on which the LD, 14e and 14g, is mounted becomes in parallel to an incident plane for the first WDM filter 24a, where the incident plane means that a plane formed by an optical axis of the incoming beam and an optical axis of the outgoing beam.

Figure 15:
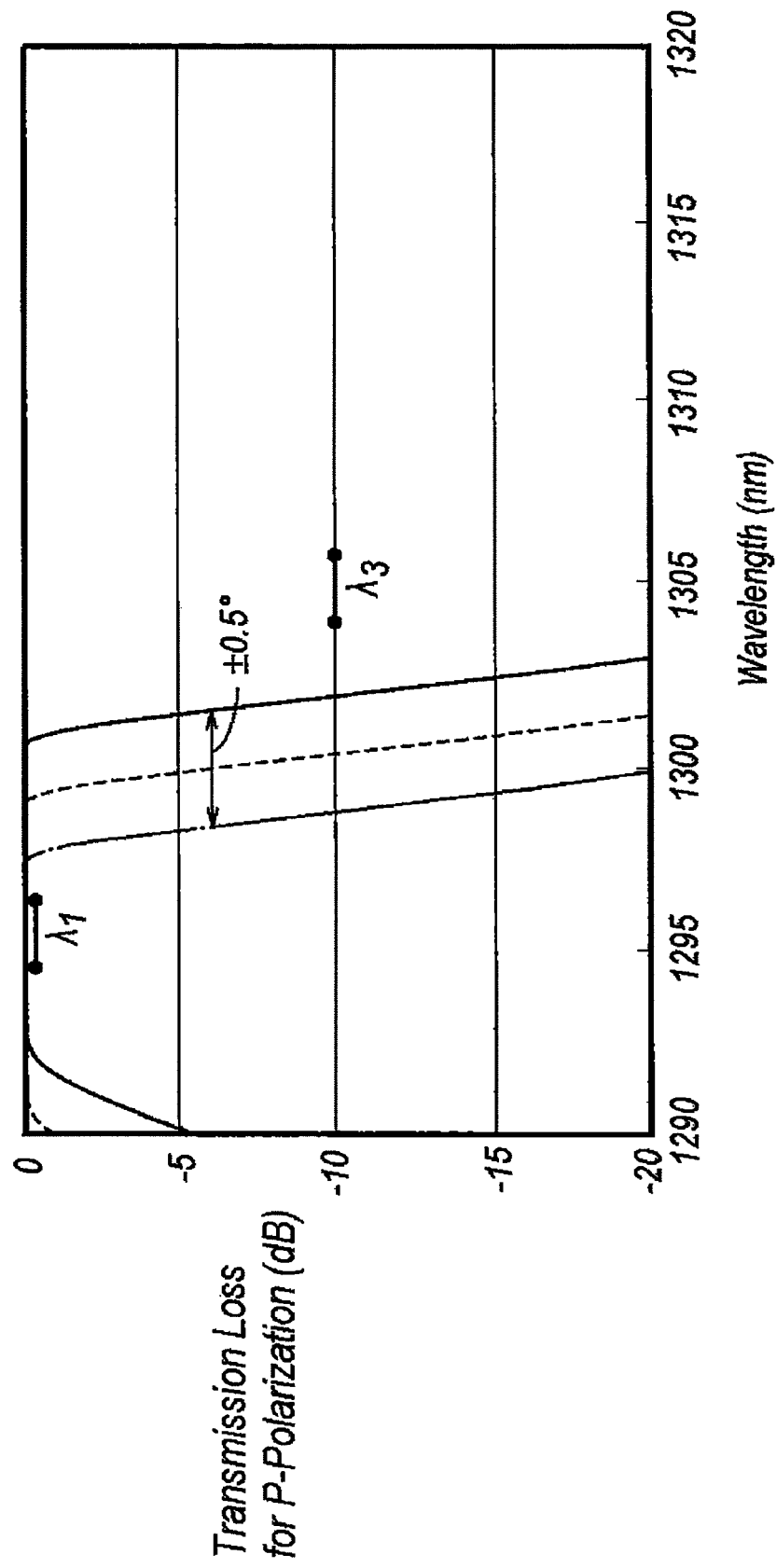
FIG. 15 shows the transmission loss of the WDM filter for two light beams each having the P-polarization to the incident plane.

FIG. 15 shows the wavelength dependence of the transmission loss of the WDM filter 24a for the P-component. In the evaluation, the wavelengths $\lambda_1$ to $\lambda_4$ were assumed to be 1295.56, 1300.05, 1304.58, and 1309.14 nm, respectively. FIG. 15 also shows a varied range of the transmission loss when the light entering the WDM filter 24a has an offset angle of ±0.5°. As shown in FIG. 15, the WDM filter 24a may transmit substantially whole light coming from the first TOD 17e whose incident angle is almost 45°, while, it may transmit substantially no light coming from the third TOD 17G at the incident angle of nearly 45° which means that the WDM filter 24a may reflect substantially whole light coming from the third TOD 17G. Thus, the first WDM filter 24a which has multilayered dielectric films and is designed to have the cut-off wavelength of 1300 nm may multiplex the light from the first TOD 17E with the light from the third TOD 17G both of which has the P-component.

Figure 16:
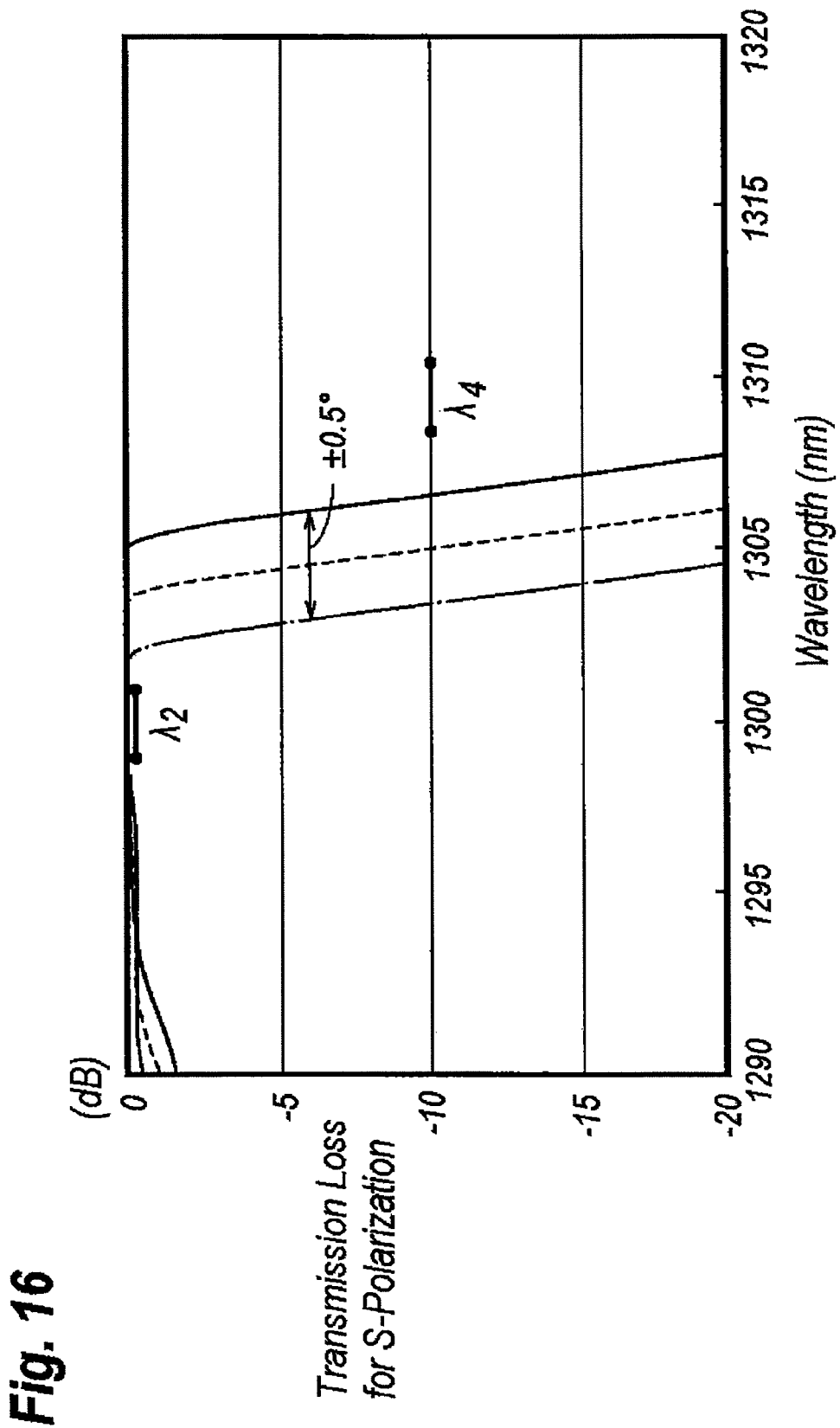
FIG. 16 shows the transmission loss of the WDM filter for two light beams each having the S-polarization to the incident plane.

The optical module 10K according to the present embodiment further multiplexes the S-component of the light coming from the second TOD 17F with the S-component of the light coming from the fourth TOD 17H by the second WDM filter 24b. FIG. 16 shows the wavelength dependence of the transmission loss of the second WDM filter 24b. FIG. 16 also shows a varied range of the transmission loss when the light entering the WDM filter 24b has an offset angle of ±0.5° which means that the incident angle of the light entering the WDM filter, 24a and 24b, is offset from 45°. As shown in FIG. 16, the light from the second TOD 17F with the wavelength of 1300.05 nm and the polarization direction thereof is perpendicular to the incident plane is almost fully transmitted through the WDM filter 24b, while, the light coming from the fourth TOD 17H is substantially cut, in other words, is substantially reflected by the WDM filter 24b. In this case shown in FIG. 16, both light make an incident angle of substantially 45° to the WDM filter 24b and the WDM filter 24b also has a multilayered structure of dielectric films and is designed to have the cut-off wavelength of 1305 nm. The TODs, 17F and 17G, are attached to the subsidiary coupling unit 11L such that the primary surface of the sub-mount that mounts the LD, 14f and 14h, thereof becomes in perpendicular to the incident plane of the second WDM filter 24b.

Figure 17:
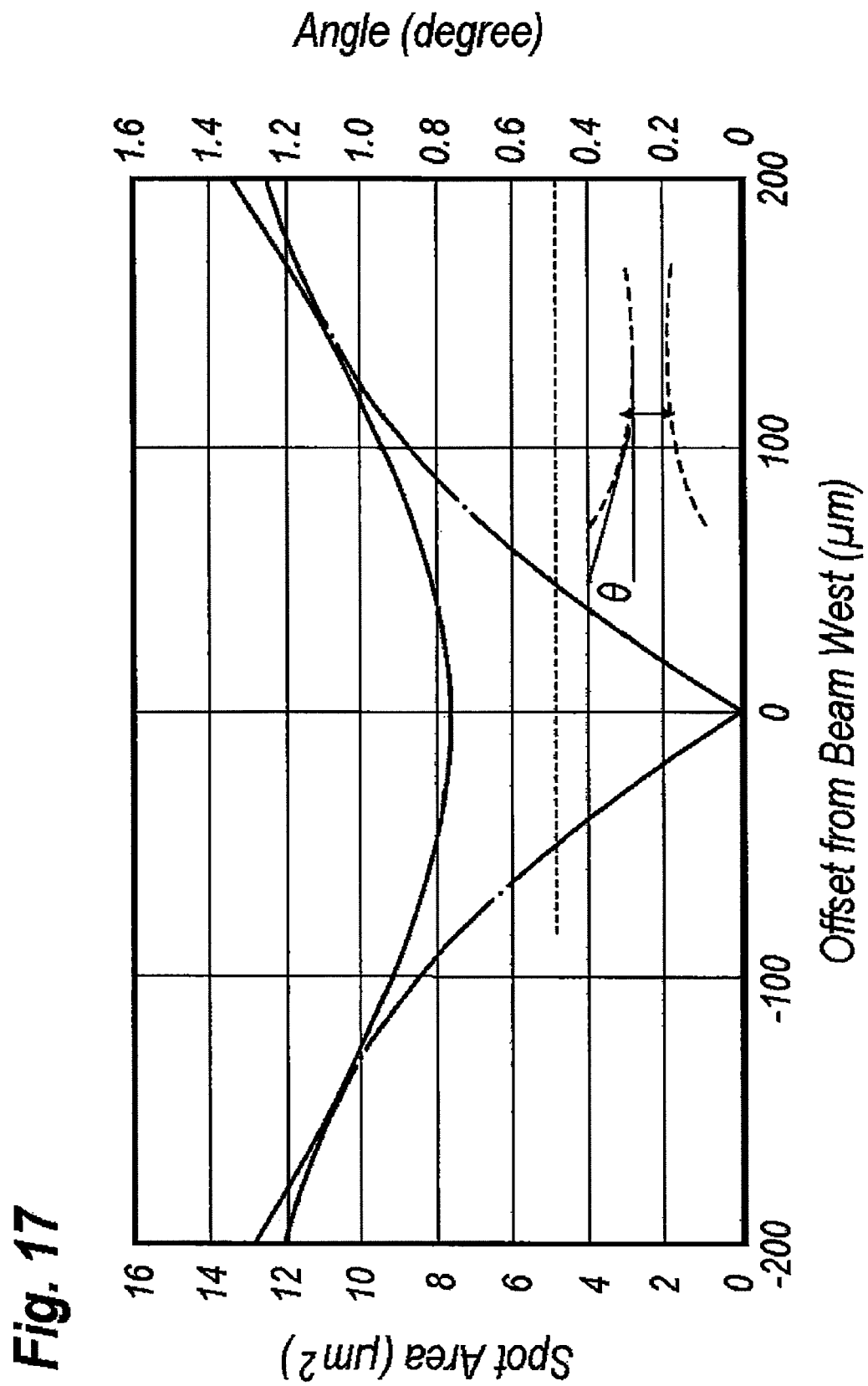
FIG. 17 shows the dependence of the spot area and the divergent angle of the light passing through the individual lens.

FIG. 17 shows a relation of the spot area and the divergent angle to the optical axis of the light beam caused by respective individual lenses, 22e to 22h. In the present optical module 11K, the position of the beam waist caused by the individual lens, 22e to 22h, and by the condenser lens 21 is set on the surface of the WDM filter, 24a and 24b, which may set the divergent angle of the light beam to be substantially zero (0) and make the spot area minimum. Moreover, the transmission characteristics shown in FIGS. 15 and 16 allow a tolerance of ±0.5° for the divergent angle of the incident beam, which corresponds to the offset of ±50 µm for the position of the beam waist. Thus, setting the beam waist caused by the condenser lens 21 and that by the individual lenses, 22e to 22h, on the surface of the WDM filters, 24a and 24b, the divergent angle for the light entering the WDM filter, 24a and 24b, may be set to be substantially zero and the wavelength selection of the WDM filter, 24a and 24b, may be secured. Moreover, in the focused optical arrangement of the present embodiment, the tolerance of ±50 µm may be secured for the beam waist for the surface of the WDM filter, 24a and 24b.

Figure 18:
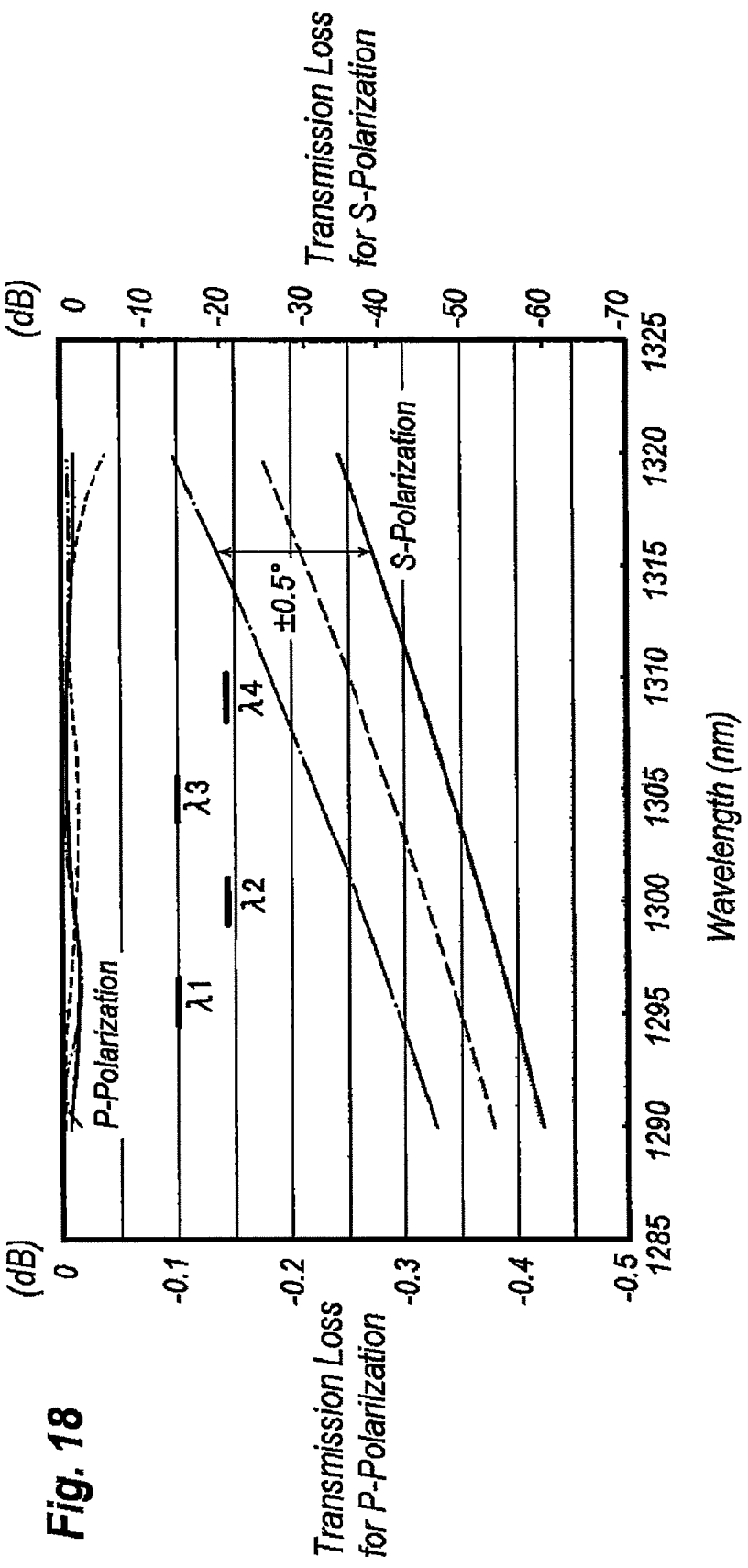
FIG. 18 shows the transmission loss of the optical coupler for the light with P-polarization and the light with the S-polarization with respect to the incident angle.

The coupler 26 multiplexes the P-component of the light coming from the first WDM filter 24a with the S-component of the light coming from the second WDM filter 24b. FIG. 18 shows the transmission loss of the coupler for the light whose polarization exists in the incident plane, that is, in the plane formed by the normal line of the coupler 26 and the axis of the incident beam, which is the P-component; and the light whose polarization is perpendicular to the incident plane, which is the S-component. As FIG. 18 shows, the transmission loss of the coupler for the P-component is less than −0.05 dB which means that almost whole light coming from the first WDM filter 24a whose wavelengths are $\lambda_1$ and $\lambda_3$ are transmitted through the coupler 26; while, almost whole light coming from the second WDM filter 24b whose wavelengths are $\lambda_2$ and $\lambda_4$ are reflected by the coupler 26. Thus, the coupler 26 may multiplex the light with the P-Polarization which comes from the first WDM filter 24a with the light with the S-Polarization which comes from the second WDM filter 24b.

Next, a method to assemble the optical module 10K will be described. First, two WDM filters, 24a and 24b are installed and fixed in respective coupling units, 11K and 11L. The optical fiber 13 secured within the sleeve 16 and the condenser lens 21 are also fixed in the primary coupling unit 11K. The alignment of those components may be performed primarily by the physical dimensions of the components except for the alignment of the sleeve 16 in a plane perpendicular to the optical axis because the condenser lens 21 has the image magnification of unity (1), which may increase the alignment tolerance along the optical axis thereof. For the optical alignment in the plane perpendicular to the optical axis, the slide of the sleeve 16 on the outer surface of the primary coupling unit 11K may carry out.

Subsequently, respective TODs, 17E to 17H, are aligned with the coupling units, 11K and 11L, such that the polarization direction of the light emitted therefrom are first adjusted in parallel to the incident plane for the first WDM filter 24a, and in perpendicular to the incident plane for the second WDM filter by rotating the TODs, 17E to 17H, within respective J-sleeves, 18e to 18h; then, the beam waist caused by the individual lens, 22e to 22h, is aligned with the beam waist formed by the condenser lens 21, which is almost at the surface of the WDM filter, 24a and 24b. Practically activating the LD, 14e to 14h, sliding the J-sleeve, 18e to 18h, on the outer wall of the coupling unit, 11K and 11L, and adjusting the depth of the TOD, 17E to 17H, into the J-sleeve, 18e to 18h; the TOD, 17E to 17H, is fixed in a position where the monitored light through the optical fiber 13 becomes maximum. As shown in FIG. 17, the alignment of the position of the beam waist shows an enough tolerance of ±50 µm for the variation of the incident angle within ±0.5°, which enables the alignment of the TODs, 17E to 17H, to be simple enough.

Figure 19:
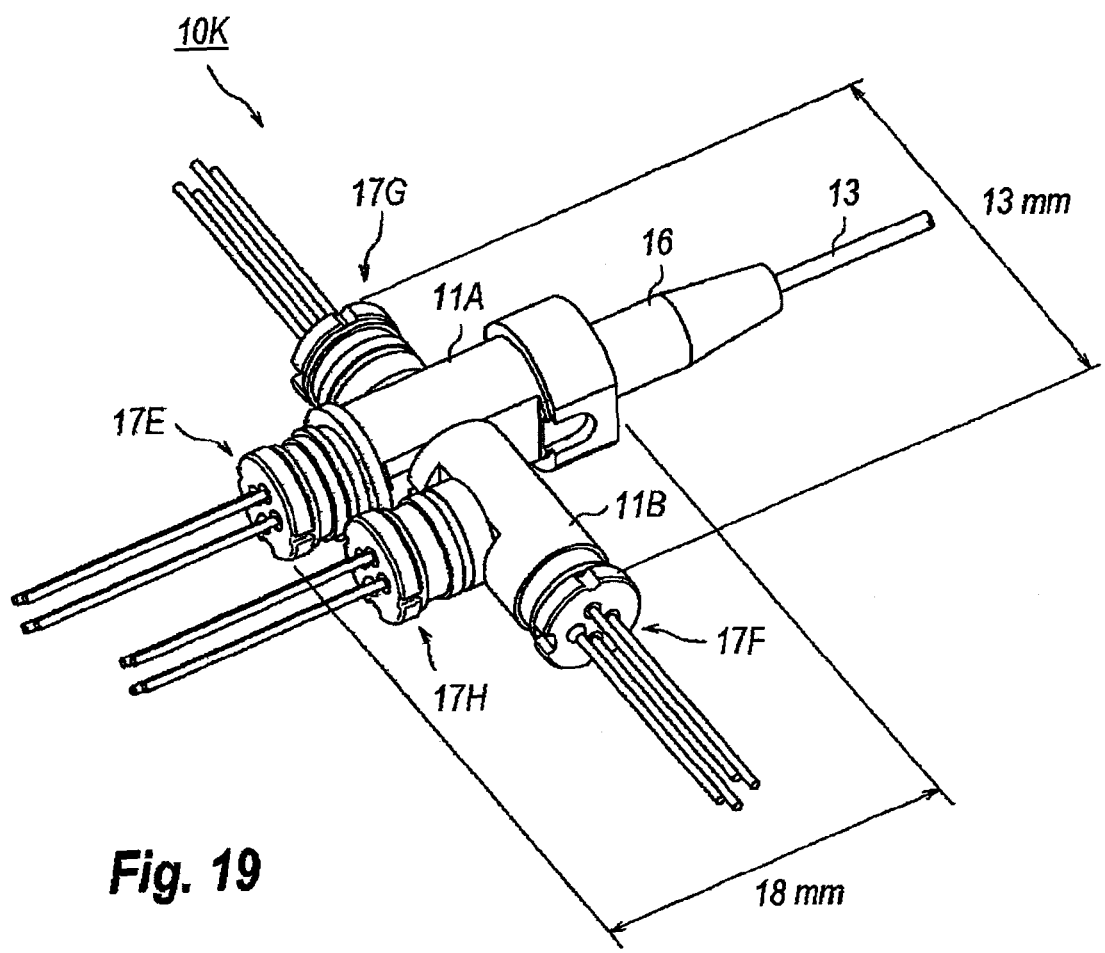
FIG. 19 is an outer appearance of the optical module that provides four TODs coupled with the single optical fiber by the focused beam coupling system shown in FIG. 14.

FIG. 19 is a perspective view showing an outer appearance of the optical module 11K with physical dimensions thereof. The dimensions appeared in FIG. 19 are typical example thereof. The optical module 11K according to the present embodiment has an actual length and width of 18 mm and 13 mm, respectively, in a primary portion thereof. Thus, according to the present invention, even the optical module with the configuration of the multiple transmitter optical devices applicable to the WDM communication, a compact optical module may be obtained.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

The invention claimed is:

1. An optical module for communicating with a single optical fiber by a focused coupling system, comprising:
   a first transmitter optical device that provides a first LD for emitting light with a first specific wavelength $\lambda_1$, a first individual lens having one of beam waists aligned with said first LD, and a first joint sleeve;
   a second transmitter optical device that provides a second LD for emitting light with a second specific λ2 wavelength different from said first specific wavelength $\lambda_1$, a second individual lens having one of beams waists aligned with said second LD, and a second joint sleeve;

a WDM filter that multiplexes said light provided from said first LD through said first individual lens with said light provided from said second LD through said second individual lens; and a condenser lens for coupling said WDM filter optically with said optical fiber, said condenser lens having one of beam waists located on an end of said optical fiber; and a coupling unit configured to install said condenser lens and said WDM filter therein, said coupling unit having first to fourth outer walls, said single optical fiber being fixed in said first outer wall, said first transmitter optical device being attached to said second outer wall of said coupling unit facing said first outer wall through said first joint sleeve, said second transmitter optical device being attached to said third outer wall of said coupling unit through said second joint sleeve, said third outer wall extending in perpendicular to said first and second outer walls, wherein said first joint sleeve aligns another beam waist of said first individual lens with another beam waist of said condenser lens on said second outer wall, and said second joint sleeve aligns another beam waist of said second individual lens with said another beam waist of said condenser lens on said third outer wall.

2. The optical module of claim 1,
wherein said condenser lens has an image magnification of unity.

3. The optical module of claim 1,
further comprising an optical isolator put between said condenser lens and said optical fiber in said coupling unit.

4. The optical module of claim 1,
wherein said WDM filter makes 45° with respect to an optical axis of said first transmitter optical device, to an optical axis of said condenser lens, and to an optical axis of said second transmitter optical device.

5. The optical module of claim 4,
wherein said another beam waist of said condenser lens is aligned with said another beam waist of said first individual lens at said second outer wall and said another beam waist of said second individual lens at said third outer wall, and
wherein said first and second transmitter optical devices each emits light with same polarization direction with respect to an incident plane of said WDM filter.

6. The optical module of claim 5,
wherein said first LD and said second LD are an edge-emitting type.

7. An optical module for communicating with a single optical fiber by a focused coupling system, comprising:
a first transmitter optical device that provides a first LD for emitting light with a first specific wavelength $\lambda_1$, and a first individual lens having one of beam waists aligned with said first LD;
a second transmitter optical device that provides a second LD for emitting light with a second specific $\lambda_2$ wavelength different from said first specific wavelength $\lambda_1$, and a second individual lens having one of beam waists aligned with said second LD;
a WDM filter that multiplexes said light provided from said first LD with said light provided from said second LD;
a condenser lens for coupling said WDM filter optically with said optical fiber, said condenser lens having one of beam waists located on an end of said optical fiber;
a coupling unit configured to install said first WDM filter and said condenser lens;
a third transmitter optical device that provides a third LD for emitting light with a third specific wavelength $\lambda_3$, and a third individual lens having one of beam waists aligned with said third LD;
a fourth transmitter optical device that provides a fourth LD for emitting light with a fourth specific wavelength $\lambda_4$, and a fourth individual lens having one of beam waists aligned with said fourth LD;
another WDM filter that multiplexes said light provided from said third LD and said light provided from said fourth LD; and
a coupler that multiplexes light coming from said WDM filter with light coming from said other WDM filter,
wherein said condenser lens has another beam waist aligned with another beam waist of said first individual lens and with another beam waist of said second individual lens,
wherein said optical fiber is provided in a first outer wall of said coupling unit, said first optical device is provided in a second outer wall which faces said first outer wall and is substantially in parallel thereto, and said second optical device is provided in a third outer wall substantially in perpendicular to said first and second outer walls, and
wherein said WDM filter makes 45° with respect to an optical axis of said first transmitter optical device, to an optical axis of said condenser lens, and to an optical axis of said second transmitter optical device, and
wherein said other beam waist of said condenser lens is aligned with said other beam waist of said third individual lens and said other beam waist of said fourth individual lens at a surface of said other WDM filter.

8. The optical module of claim 7,
further comprising a subsidiary coupling unit that provides said other WDM filter,
wherein said subsidiary coupling unit in a first wall thereof is attached to a fourth outer wall of the coupling unit facing said third outer wall and substantially in parallel thereto, and in perpendicular to said first and second outer walls, said third transmitter optical device is attached to a second wall facing said first wall of said subsidiary coupling unit and substantially in parallel thereto, and said fourth transmitter optical device is attached to a third wall of said subsidiary coupling unit which is substantially in perpendicular to said first and second walls of said subsidiary coupling unit, and
wherein said other WDM filter makes a half right angle to an optical axis of said third transmitter optical device and to an optical axis of said fourth transmitter optical device.

9. The optical module of claim 7,
wherein said light provided from said third transmitter optical device and said light provided from said fourth transmitter optical device have a same polarization direction with respect to an incident plane of said other WDM filter.

10. The optical module of claim 9,
wherein said polarization direction of light coming from said WDM filter and said polarization direction of light coming from said other WDM filter makes a right angle with respect to an incident plane for said optical coupler.

11. The optical module of claim 7,
wherein said first to fourth wavelengths have a relation of $\lambda_1 < \lambda_3 < \lambda_2 < \lambda_4$.

* * * * *